(12) United States Patent
Tokunaga

(10) Patent No.: US 12,594,791 B2
(45) Date of Patent: Apr. 7, 2026

(54) TIRE

(71) Applicant: The Yokohama Rubber Co., LTD., Tokyo (JP)

(72) Inventor: Reika Tokunaga, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 417 days.

(21) Appl. No.: 17/650,981

(22) Filed: Feb. 14, 2022

(65) Prior Publication Data

US 2022/0258541 A1 Aug. 18, 2022

(30) Foreign Application Priority Data

Feb. 18, 2021 (JP) ................................. 2021-024649

(51) Int. Cl.
| | |
|---|---|
| *B60C 11/13* | (2006.01) |
| *B60C 11/03* | (2006.01) |
| *B60C 11/04* | (2006.01) |
| *B60C 11/12* | (2006.01) |

(52) U.S. Cl.
CPC ........ *B60C 11/1369* (2013.01); *B60C 11/125* (2013.01); *B60C 2011/0346* (2013.01); *B60C 11/04* (2013.01); *B60C 2011/1213* (2013.01)

(58) Field of Classification Search
CPC .......................... B60C 11/1369; B60C 11/047
See application file for complete search history.

(56) References Cited

U.S. PATENT DOCUMENTS

| | | | | |
|---|---|---|---|---|
| 4,230,512 A | * | 10/1980 | Makino ............... | B60C 11/0309 |
| | | | | 152/209.27 |
| 5,833,779 A | * | 11/1998 | van der Meer ..... | B60C 11/1263 |
| | | | | 152/209.15 |
| 2013/0061993 A1 | | 3/2013 | Mathonet et al. | |
| 2013/0240103 A1 | * | 9/2013 | Maehara ............ | B60C 11/0306 |
| | | | | 152/209.25 |
| 2015/0151584 A1 | * | 6/2015 | Koishikawa ........ | B60C 11/0304 |
| | | | | 152/209.18 |
| 2018/0215204 A1 | * | 8/2018 | Kuriyama ............... | B60C 11/01 |

FOREIGN PATENT DOCUMENTS

| | | | |
|---|---|---|---|
| JP | S61113504 A | | 5/1986 |
| JP | H05-286311 A | | 11/1993 |
| JP | H0624212 A | * | 2/1994 |
| JP | 2014-051287 A | | 3/2014 |
| JP | 6162939 B1 | | 7/2017 |

* cited by examiner

*Primary Examiner* — Katelyn W Smith
*Assistant Examiner* — Thomas Frank Schneider
(74) *Attorney, Agent, or Firm* — Thorpe North & Western

(57) ABSTRACT

A tire includes a plurality of circumferential grooves extending in a tire circumferential direction, and a plurality of land portions defined by the circumferential grooves. Further, at least one of the circumferential grooves includes tie bars formed in a groove bottom of the circumferential groove and connecting the land portions adjacent to each other across the circumferential groove. Furthermore, each of the tie bars includes a slit that extends through the tie bar in the tire circumferential direction and that is closed when the tire comes into contact with the ground. In addition, the slit includes an inclined portion inclined with respect to the tire circumferential direction in a tread plan view.

25 Claims, 15 Drawing Sheets

TIRE WIDTH DIRECTION

TIRE CIRCUMFERENTIAL DIRECTION

TIRE CIRCUMFERENTIAL DIRECTION

TIRE WIDTH DIRECTION

TIRE WIDTH DIRECTION

TIRE CIRCUMFERENTIAL DIRECTION

TIRE WIDTH DIRECTION

TIRE CIRCUMFERENTIAL DIRECTION

TIRE WIDTH DIRECTION

TIRE WIDTH DIRECTION

A-CROSS-SECTIONAL VIEW

TIRE WIDTH DIRECTION

B-CROSS-SECTIONAL VIEW

TIRE
CIRCUMFERENTIAL
DIRECTION

TIRE WIDTH DIRECTION

COMPARATIVE EXAMPLE

| | Comparative Example | Example 1 | Example 2 | Example 3 | Example 4 | Example 5 | Example 6 |
|---|---|---|---|---|---|---|---|
| Slit planar shape | FIG.18 | FIG.8 | FIG.8 | FIG.8 | FIG.8 | FIG.8 | FIG.8 |
| Inclined portion of slit | No | Yes | Yes | Yes | Yes | Yes | Yes |
| Offset of end portion of slit | No | Yes | Yes | Yes | Yes | Yes | Yes |
| Bent portion of slit | No | No | No | No | No | No | No |
| Dd/W51 | 0 | 0 | 0.8 | 1.2 | 2.00 | 2.00 | 2.00 |
| Dd/Wg2 | 0 | 0 | 0.05 | 0.07 | 0.80 | 0.08 | 0.80 |
| L52A/P21 | 0.45 | 0.45 | 0.45 | 0.45 | 0.45 | 0.45 | 0.45 |
| L52B/L52A | 1.00 | 1.00 | 1.00 | 1.00 | 1.00 | 1.00 | 1.00 |
| Ld/L52A | 0 | 0 | 0 | 0 | 0 | 0 | 0 |
| L51/L52A | 1.00 | 1.00 | 1.00 | 1.00 | 1.00 | 1.00 | 1.00 |
| L51/L52B | 1.00 | 1.00 | 1.00 | 1.00 | 1.00 | 1.00 | 1.00 |
| Top surface of tie bar | Flat | Flat | Flat | Flat | Flat | Flat | Flat |
| H5t/Hg2 | 0.09 | 0.09 | 0.09 | 0.09 | 0.09 | 0.09 | 0.09 |
| (H51+H5t)/Hg2 | 1.00 | 1.00 | 1.00 | 1.00 | 1.00 | 1.00 | 1.00 |
| Offset of tie bar from through narrow groove | No | No | No | No | No | No | No |
| Low rolling resistance performance | 100 | 101 | 101 | 101 | 102 | 102 | 102 |
| Wet traction performance | 100 | 100 | 100 | 100 | 100 | 101 | 100 |

FIG. 20

| | Example 7 | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| Slit planar shape | FIG. 11 | FIG. 11 | FIG. 11 | FIG. 11 | FIG. 11 | FIG. 11 | FIG. 11 | FIG. 11 | FIG. 11 | FIG. 11 | FIG. 11 | FIG. 11 |
| Inclined portion of slit | Yes | Yes | Yes | Yes | Yes | Yes | Yes | Yes | Yes | Yes | Yes | Yes |
| Offset of end portion of slit | Yes | Yes | Yes | Yes | Yes | Yes | Yes | Yes | Yes | Yes | Yes | Yes |
| Bent portion of slit | Yes | Yes | Yes | Yes | Yes | Yes | Yes | Yes | Yes | Yes | Yes | Yes |
| Dd/W51 | 2.00 | 2.00 | 2.00 | 2.00 | 2.00 | 2.00 | 2.00 | 2.00 | 2.00 | 2.00 | 2.00 | 2.00 |
| Dd/Wg2 | 0.80 | 0.40 | 0.08 | 0.08 | 0.08 | 0.08 | 0.08 | 0.08 | 0.08 | 0.08 | 0.08 | 0.08 |
| L52A/P21 | 0.45 | 0.45 | 0.45 | 0.45 | 0.45 | 0.45 | 0.45 | 0.45 | 0.45 | 0.45 | 0.45 | 0.45 |
| L52B/L52A | 1.00 | 1.00 | 1.00 | 1.00 | 1.00 | 1.00 | 1.00 | 1.00 | 1.00 | 1.00 | 1.00 | 1.00 |
| Ld/L52A | 0 | 0 | 0 | 0.05 | 0.15 | 0.30 | 0.15 | 0.15 | 0.15 | 0.15 | 0.15 | 0.15 |
| L51/L52A | 1.00 | 1.00 | 1.00 | 0.95 | 0.85 | 0.70 | 0.85 | 0.85 | 0.85 | 0.85 | 0.85 | 0.85 |
| L51/L52B | 1.00 | 1.00 | 1.00 | 0.95 | 0.85 | 0.70 | 0.85 | 0.85 | 0.85 | 0.85 | 0.85 | 0.85 |
| Top surface of tie bar | Flat | Flat | Flat | Flat | Flat | Flat | V-shape | V-shape | V-shape | V-shape | V-shape | V-shape |
| H5t/Hg2 | 0.09 | 0.09 | 0.09 | 0.09 | 0.09 | 0.09 | 0.15 | 0.30 | 0.45 | 0.30 | 0.30 | 0.30 |
| (H51+H5t)/Hg2 | 1.00 | 1.00 | 1.00 | 1.00 | 1.00 | 1.00 | 1.00 | 1.00 | 1.00 | 0.80 | 0.65 | 0.80 |
| Offset of tie bar from through narrow groove | No | No | No | No | No | No | No | No | No | No | No | Yes |
| Low rolling resistance performance | 103 | 103 | 103 | 103 | 104 | 104 | 105 | 105 | 103 | 104 | 103 | 106 |
| Wet traction performance | 99 | 100 | 101 | 102 | 101 | 100 | 100 | 101 | 102 | 103 | 104 | 102 |

FIG. 21

TIRE

CROSS-REFERENCE TO RELATED APPLICATIONS

This application claims priority pursuant to 35 U.S.C. 119(a) to Japan Patent Application No. 2021-024649, filed Feb. 18, 2021, which application is incorporated herein by reference in its entirety.

TECHNICAL FIELD

The technology relates to a tire and particularly relates to a tire that can provide low rolling resistance performance and wet performance in a compatible manner.

BACKGROUND ART

In recent years, a configuration where tie bars are disposed in a circumferential groove is employed in order to reduce tire rolling resistance. On the other hand, there is also a problem that tire wet performance should be ensured. Technology described in Japan Patent No. 6162939 is known as a tire in the related art associated with such a problem.

SUMMARY

The technology provides a tire that can provide low rolling resistance performance and wet performance in a compatible manner.

A tire according to an embodiment of the technology includes a plurality of circumferential grooves extending in a tire circumferential direction, and a plurality of land portions defined by the circumferential grooves. At least one of the circumferential grooves includes a tie bar formed in a groove bottom of the at least one of the circumferential grooves and connecting the land portions adjacent to each other across the at least one of the circumferential grooves. The tie bar includes a slit that extends through the tie bar in the tire circumferential direction and that is closed when the tire comes into contact with a ground. A center line of the slit includes an inclined portion that is inclined with respect to the tire circumferential direction in a tread plan view.

In the tire according to an embodiment of the technology, (1) the circumferential groove includes the tie bars connecting the land portions adjacent to each other. Thus, the rigidity of the land portions when the tire comes into contact with the ground is reinforced by the tie bars, and tire rolling resistance is reduced. Further, (2) the tie bar includes the slit, and thus reduction in drainage properties of the circumferential groove, which is due to the installation of the tie bars is suppressed. Furthermore, (3) the slit is closed when the tire comes into contact with the ground, and thus reinforcement of the rigidity of the land portions by the tie bars is ensured. In addition, (4) the slit includes the inclined portion that is inclined with respect to the tire circumferential direction, and thus wall surfaces of the slit have engagement components in both the tire width direction and the tire circumferential direction when the slit is closed. Accordingly, reinforcement of the rigidity of the land portions by the tie bars is improved. As a result, there is an advantage of providing low rolling resistance performance and wet performance of the tire in a compatible manner.

BRIEF DESCRIPTION OF DRAWINGS

FIG. 20 is a table indicating the results of performance tests of tires according to embodiments of the technology.

FIG. 21 is a table indicating the results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
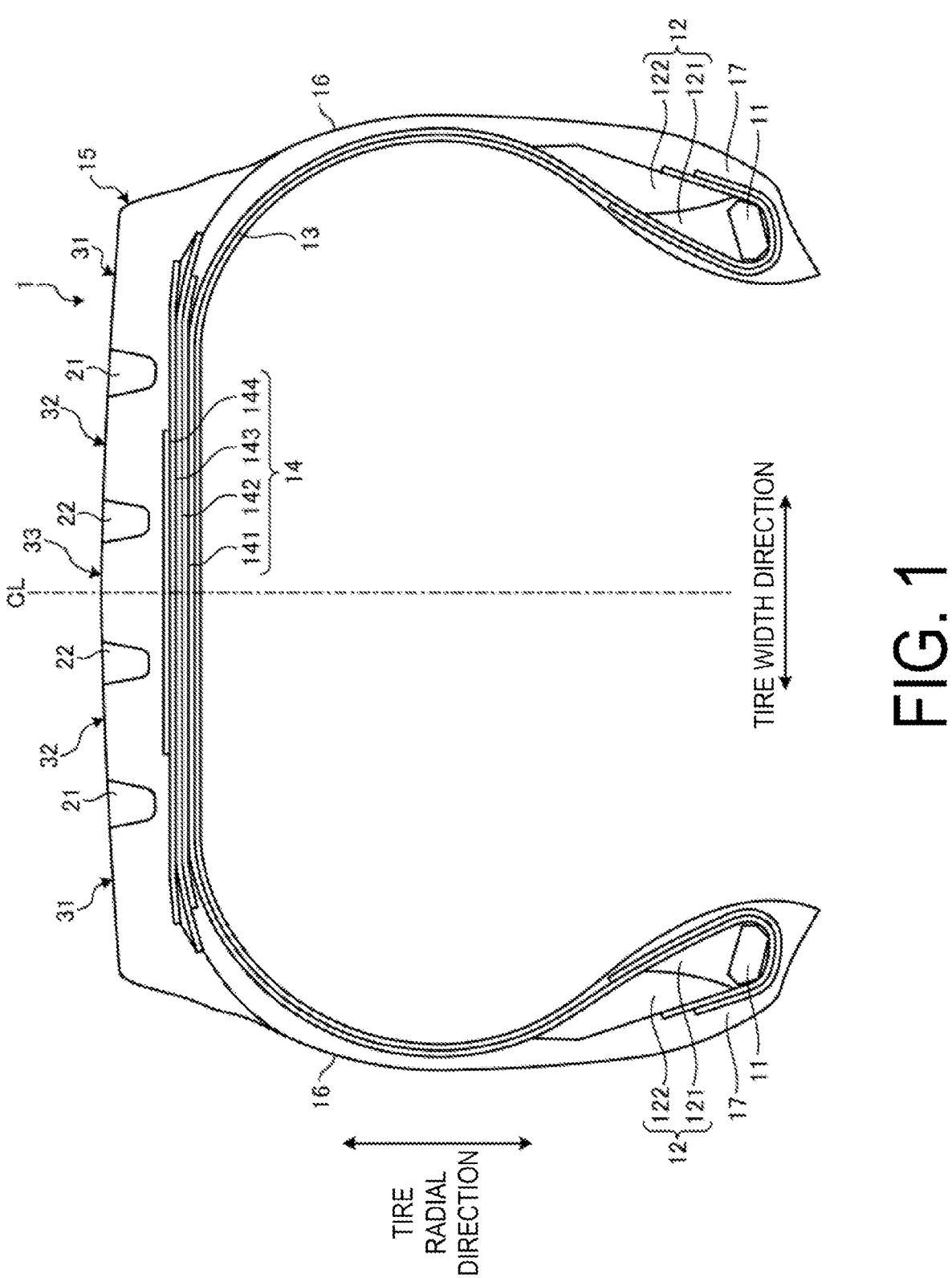
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. Additionally, in the embodiment, a heavy duty pneumatic radial tire mounted on a steered wheel of a tractor will be described as an example of the tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are each made of a lower filler 121 and an upper filler 122. The pair of bead fillers 12, 12 are disposed in outer circumferences in the tire radial direction of the pair of bead cores 11, 11, respectively, and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. Additionally, the carcass ply of the carcass layer 13 is constituted by covering, with coating rubber, a plurality of carcass cords made of steel and by performing a rolling process on the carcass cords. The carcass ply of the carcass layer 13 has a cord angle (defined as an inclination angle in a longitudinal direction of the carcass cords with respect to a tire circumferential direction) of 80 degrees or more and 90 degrees or less as an absolute value for a radial tire and 30 degrees or more and 45 degrees or less as an absolute value for a bias tire.

The belt layer 14 is made of a plurality of belt plies 141 to 144 being layered, and is disposed around an outer circumference of the carcass layer 13. These belt plies 141 to 144 include a large-angle belt 141, a pair of cross belts 142 and 143, and a belt cover 144. The large-angle belt 141 is constituted by covering, with coating rubber, a plurality of belt cords made of steel and by performing a rolling process on the belt cords. The large-angle belt 141 has a cord angle (defined as an inclination angle in a longitudinal direction of the belt cords with respect to the tire circumferential direction) of 45 degrees or more and 70 degrees or less as an absolute value. The pair of cross belts 142, 143 are each constituted by covering, with coating rubber, a plurality of belt cords made of steel and by performing a rolling process on the belt cords. Each of the pair of cross belts 142, 143 has a cord angle of 10 degrees or more and 55 degrees or less as an absolute value. Additionally, the pair of cross belts 142, 143 have cord angles having mutually opposite signs, and the pair of cross belts 142, 143 are layered by making the belt cords mutually intersect in the longitudinal direction of the belt cords (a so-called crossply structure is formed). The belt cover 144 is constituted by covering, with coating rubber, a plurality of belt cover cords made of steel or an organic fiber material and by performing a rolling process on the belt cover cords. The belt cover 144 has a cord angle of 10 degrees or more and 55 degrees or less as an absolute value.

The tread rubber 15 is disposed on an outer periphery in the tire radial direction of the carcass layer 13 and the belt layer 14 and constitutes a tread portion of the tire 1. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions.

Tread Surface

Figure 2:
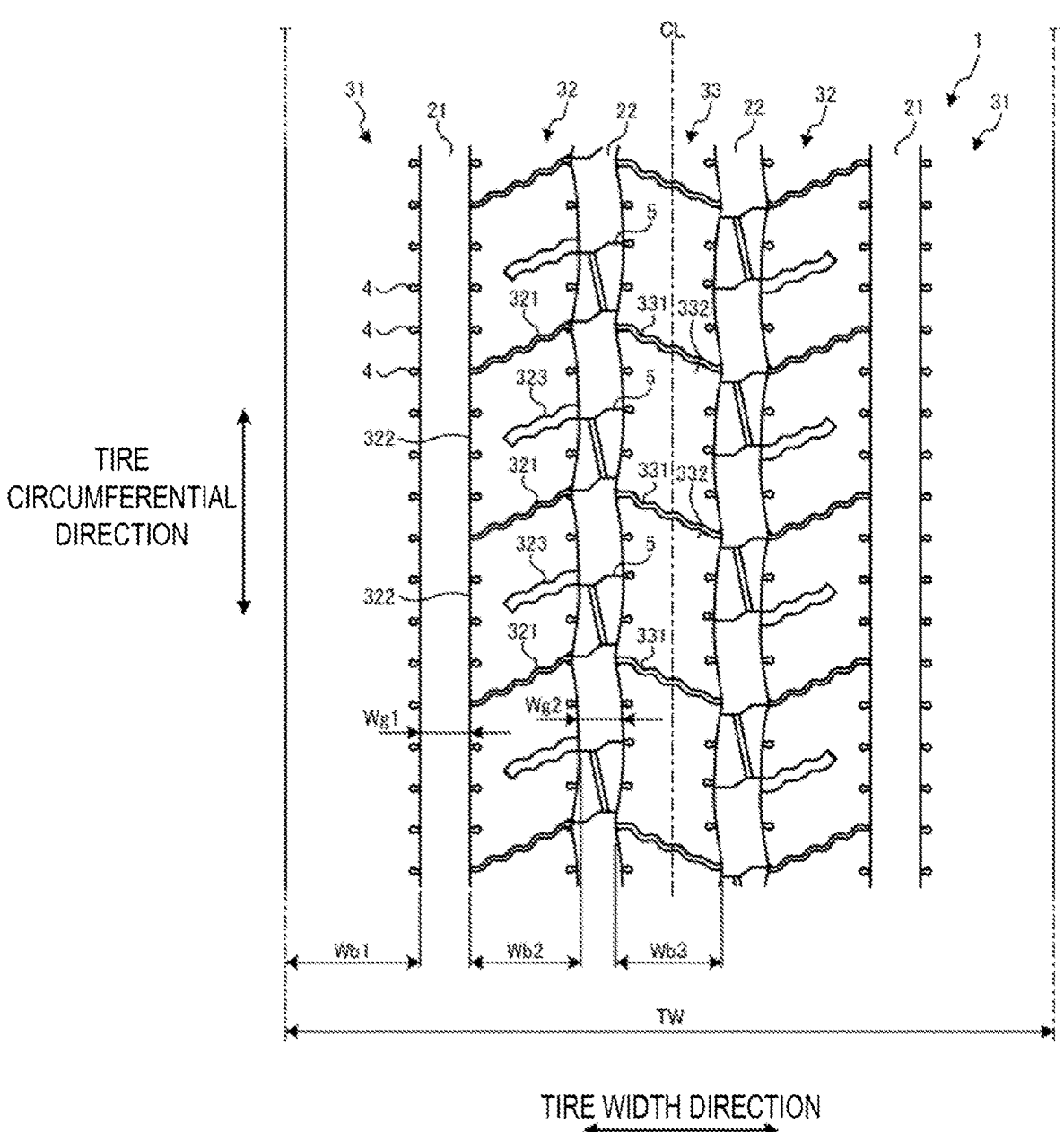
FIG. 2 is a plan view illustrating a tread surface of the tire illustrated in FIG. 1.

FIG. 2 is a plan view illustrating a tread surface of the tire 1 illustrated in FIG. 1. The same drawing illustrates the tread surface of the tire for regional operation, which mainly travels on express highways. In the same drawing, "tire circumferential direction" refers to the direction about the tire rotation axis. Additionally, reference sign T denotes a tire ground contact edge, and dimension symbol TW denotes a tire ground contact width. Additionally, in the same drawing, the tire 1 includes a tread surface that is substantially point symmetric, and thus a portion of reference signs of constituents in a region on the right side in the drawing is omitted.

As illustrated in FIG. 2, the tire 1 includes, in the tread surface, four circumferential grooves 21, 22 and five rows of land portions 31 to 33.

The circumferential grooves 21, 22 are formed of a pair of shoulder main grooves 21, 21 and two center grooves 22, 22. The circumferential grooves 21, 22 have an annular structure continuously extending around the entire circumference of the tire. The shoulder main grooves 21 are defined as main grooves on the outermost side in the tire width direction of the plurality of circumferential grooves 21, 22. "Main groove" refers to a groove on which a wear indicator must be provided as specified by JATMA. Additionally, the pair of shoulder main grooves 21, 21 are disposed in left and right regions between which the tire equatorial plane CL lies as a boundary. The center groove 22 is defined as a circumferential groove further on the tire equatorial plane CL side than the shoulder main groove 21.

Further, the shoulder main groove 21 has a groove width Wg1 (see FIG. 2) of 5.0 mm or more and a groove depth Hg1 (see FIG. 5 described below) of 10 mm or more. Furthermore, the center groove 22 has a groove width Wg2 (see FIG. 2) of 5.0 mm or more and a groove depth Hg2 (see FIG. 5 described below) of 10 mm or more. Additionally, the groove width Wg2 of the center groove 22 is in the range $0.20 \leq Wg2/Wg1 \leq 1.00$ with respect to the groove width Wg1 of the shoulder main groove 21, and is preferably in the range $0.25 \leq Wg2/Wg1 \leq 0.40$. Moreover, the groove depth Hg2 of the center groove 22 is in the range $0.70 \leq Hg2/Hg1 \leq 1.30$ with respect to the groove depth Hg1 of the shoulder main groove 21. In the configuration of FIG. 2, the center groove 22 is a main groove on which a wear indicator must be provided as specified by JATMA, and the center groove 22 has the groove width Wg2 that is smaller than the groove width Wg1 of the shoulder main groove 21 and has the groove depth Hg2 that is equal to the groove depth Hg1 of the shoulder main groove 21. Accordingly, drainage properties of the tread portion center region are ensured and the rigidity thereof is enhanced.

The groove width is measured as a maximum value of a distance between opposed groove walls of a groove opening portion on the tread contact surface when the tire is mounted on a specified rim, inflated to a specified internal pressure, and in an unloaded state. In a configuration in which the groove opening portion includes a notch portion or a chamfered portion, the groove width is measured by using, as end points, intersection points of an extension line of a tread contact surface and extension lines of the groove walls, in a cross-sectional view parallel to a groove width direction and a groove depth direction.

The groove depth is measured as the maximum value of a distance from the tread contact surface to the groove bottom when the tire is mounted on a specified rim, inflated to the specified internal pressure, and in an unloaded state. Additionally, in a configuration in which a groove bottom includes partial recess/projection portions or a sipe, the groove depth is measured excluding the partial recess/projection portions or the sipe.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

The land portions 31 to 33 are formed of a pair of shoulder land portions 31, 31, a pair of middle land portions 32, 32, and a row of a center land portion 33. The land portions 31 to 33 are defined and formed by the circumferential grooves 21, 22, and form an annular road contact surface that extends around the entire circumference of the tire. The shoulder land portion 31 is defined as a land portion defined by the shoulder main groove 21 and located on the outer side in the tire width direction. Additionally, the pair of shoulder land portions 31, 31 are disposed in the left and right regions between which the tire equatorial plane CL lies as a boundary. The middle land portion 32 is defined as a land portion defined by the shoulder main groove 21 and located on the inner side in the tire width direction. Additionally, the pair of middle land portions 32, 32 are disposed in the left and right regions between which the tire equatorial plane CL lies as a boundary. The center land portion 33 is defined as a land portion located further on the tire equatorial plane CL side than the middle land portions 32, 32.

Further, in FIG. 2, a ground contact width Wb1 of the shoulder land portion 31 is in the range $0.05 \leq Wb1/TW \leq 0.25$ with respect to a tire ground contact width TW, and is preferably in the range $0.10 \leq Wb1/TW \leq 0.20$. Furthermore, a ground contact width Wb2 of the middle land portion 32 is in the range $0.10 \leq Wb2/TW \leq 0.20$ with respect to the tire ground contact width TW. Additionally, the ground contact width Wb1 of the shoulder land portion 31 is in the range $1.10 \leq Wb1/Wb2 \leq 1.60$ with respect to the ground contact width Wb2 of the middle land portion 32. In such a configuration, the shoulder land portion 31 has a wide structure, and thus the rigidity of the shoulder land portion 31 is ensured, and uneven wear of the shoulder land portion 31 is effectively suppressed.

The ground contact width of the land portion is measured as a maximum linear distance in the tire axial direction in a contact surface between the land portion and a flat plate when the tire is mounted on a specified rim, inflated to a specified internal pressure, placed perpendicular to the flat plate in a static state, and loaded with a load corresponding to a specified load.

The tire ground contact width is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge is defined as a maximum width position in the tire axial direction of a contact surface between the tire and a flat plate when the tire is mounted on a specified rim, inflated to a specified internal pressure, placed perpendicular to the flat plate in a static state, and loaded with a load corresponding to a specified load.

Further, a ground contact width Wb3 of the center land portion 33 is in the range $0.10 \leq Wb3/TW \leq 0.20$ with respect to the tire ground contact width TW. Furthermore, the ground contact width Wb1 of the shoulder land portion 31 is in the range $1.10 \leq Wb1/Wb3 \leq 1.60$ with respect to the ground contact width Wb3 of the center land portion 33. In such a configuration, the shoulder land portion 31 has a wide structure, and thus the rigidity of the shoulder land portion 31 is ensured, and uneven wear of the shoulder land portion 31 is effectively suppressed. Additionally, the ground contact width Wb3 of the center land portion 33 is in the range $1.00 \leq Wb3/Wb2 \leq 1.50$ with respect to the ground contact width Wb2 of the middle land portion 32, and is preferably in the range $1.00 \leq Wb3/Wb2 \leq 1.20$. In such a configuration, the center land portion 33 has a wide structure, and thus the rigidity of the center land portion 33 is ensured, and uneven wear of the center land portion 33 is effectively suppressed.

Further, in the configuration of FIG. 2, the tire 1 includes the pair of shoulder main grooves 21, 21 and the two center grooves 22, 22 as described above, and thus the pair of shoulder land portions 31, 31, the pair of middle land portions 32, 32, and the single center land portion 33 are defined. However, no such limitation is intended, and the tire 1 may include one or three or more center grooves (not illustrated). In the former configuration, the center land portion is omitted, and in the latter configuration, two or more rows of center land portions are defined. Additionally, the center land portion 33 may be disposed on the tire equatorial plane CL (see FIG. 2) or may be disposed at a position away from the tire equatorial plane CL (not illustrated).

Furthermore, in the configuration of FIG. 2, the tire 1 includes a tread pattern that is point-symmetric with a center point on the tire equatorial plane CL. However, no such limitation is intended, and the tire 1 may include an axisymmetric tread pattern with the tire equatorial plane CL being as the center, a tread pattern having directionality in the tire rotation direction, or a left-right asymmetric tread pattern (not illustrated).

Furthermore, in the configuration of FIG. 2, the shoulder main groove 21 has a straight shape, and the center groove 22 has a wave-like shape with an amplitude in the tire width direction. The wave-like shape of the groove is required to have an arc shape at least at the maximum projected position toward the tire equatorial plane CL side, and includes, for example, a sinusoidal waveform shape, a zigzag shape formed by connecting a plurality of linear portions with short arcs, and a continuous arch shape formed by smoothly connecting a plurality of arcs that project toward the tire equatorial plane CL side. Such a configuration is preferable in that the rigidity of the shoulder land portion 31 is ensured and uneven wear of the shoulder land portion 31 is reduced, and at the same time, drainage properties of the tread portion center region are improved. However, no such limitation is intended, and the shoulder main groove 21 may have a wave-like shape, or the center groove 22 may have a straight shape (not illustrated).

Furthermore, in the configuration of FIG. 2, each of the land portions 31 to 33 includes a plurality of multi sipes 4. The multi sipes 4 are each a short sipe opening at one end to the edge portion of the land portions 31 to 33 and terminating at an other end on the inner side of the land portions 31 to 33. The multi sipe 4 has a width of 0.3 mm or more and 1.5 mm or less, a depth of 2.0 mm or more and 17 mm or less, and a length of 2.0 mm or more and 10 mm or less (dimensional symbols omitted in the drawings). Additionally, the plurality of multi sipes 4 are arranged in the tire circumferential direction along the edge portions on the circumferential grooves 21, 22 sides. Moreover, the pitch length of the multi sipe 4 is in the range of 0.1% or more and 0.6% or less with respect to the tire circumferential length. In such a configuration, the rigidity of the land portions 31 to 33 is reduced by the multi sipes 4, and thus ground contact pressure of the edge portions of the land portions 31 to 33 when the tire comes into contact with the ground is reduced. As a result, the occurrence of uneven wear (in particular, river wear) is suppressed, and uneven wear resistance performance of the tire is improved.

Middle Land Portion

Figure 3:
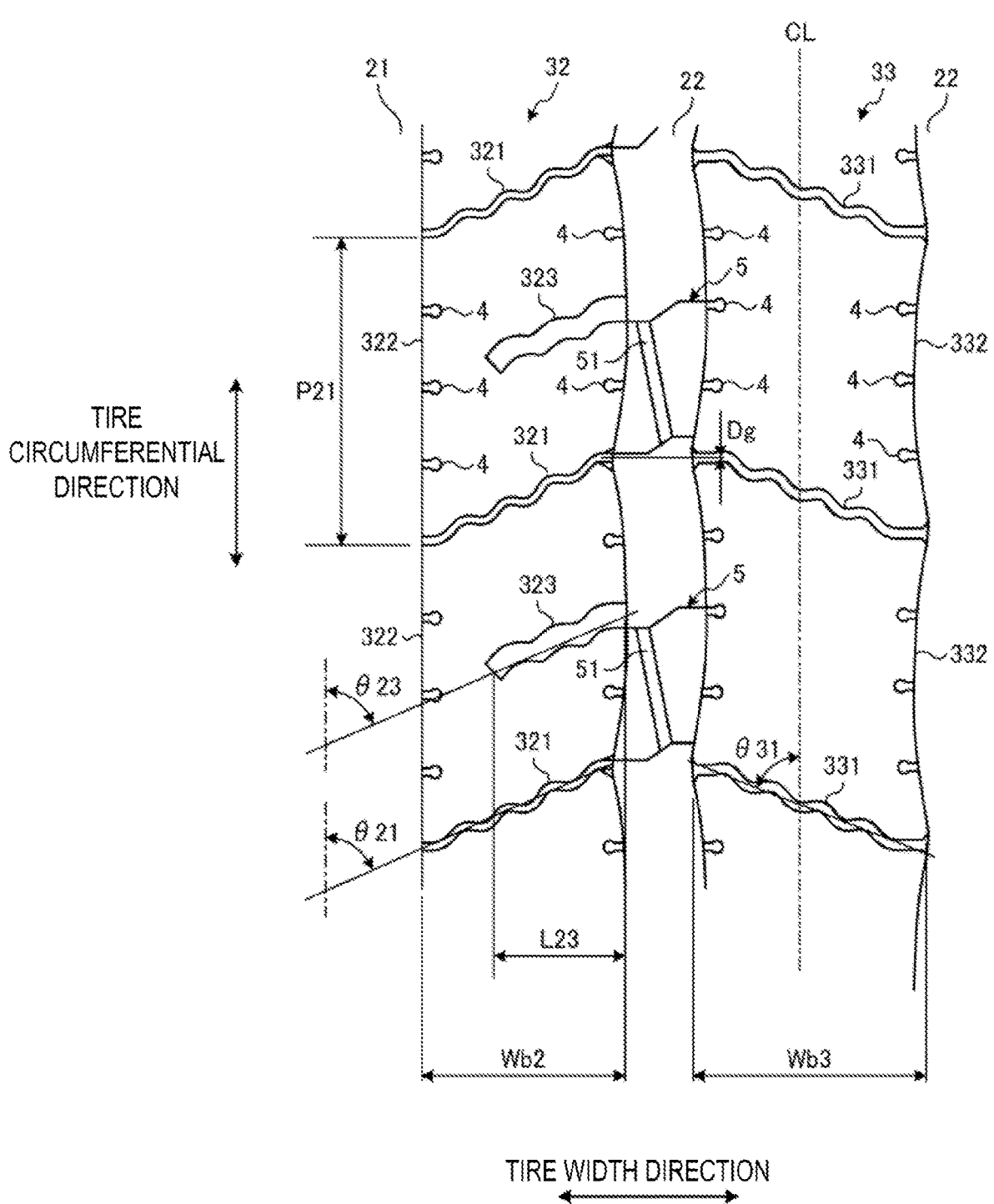
FIG. 3 is an enlarged plan view illustrating a middle land portion and a center land portion of the tire that are illustrated in FIG. 2.
Figure 4:
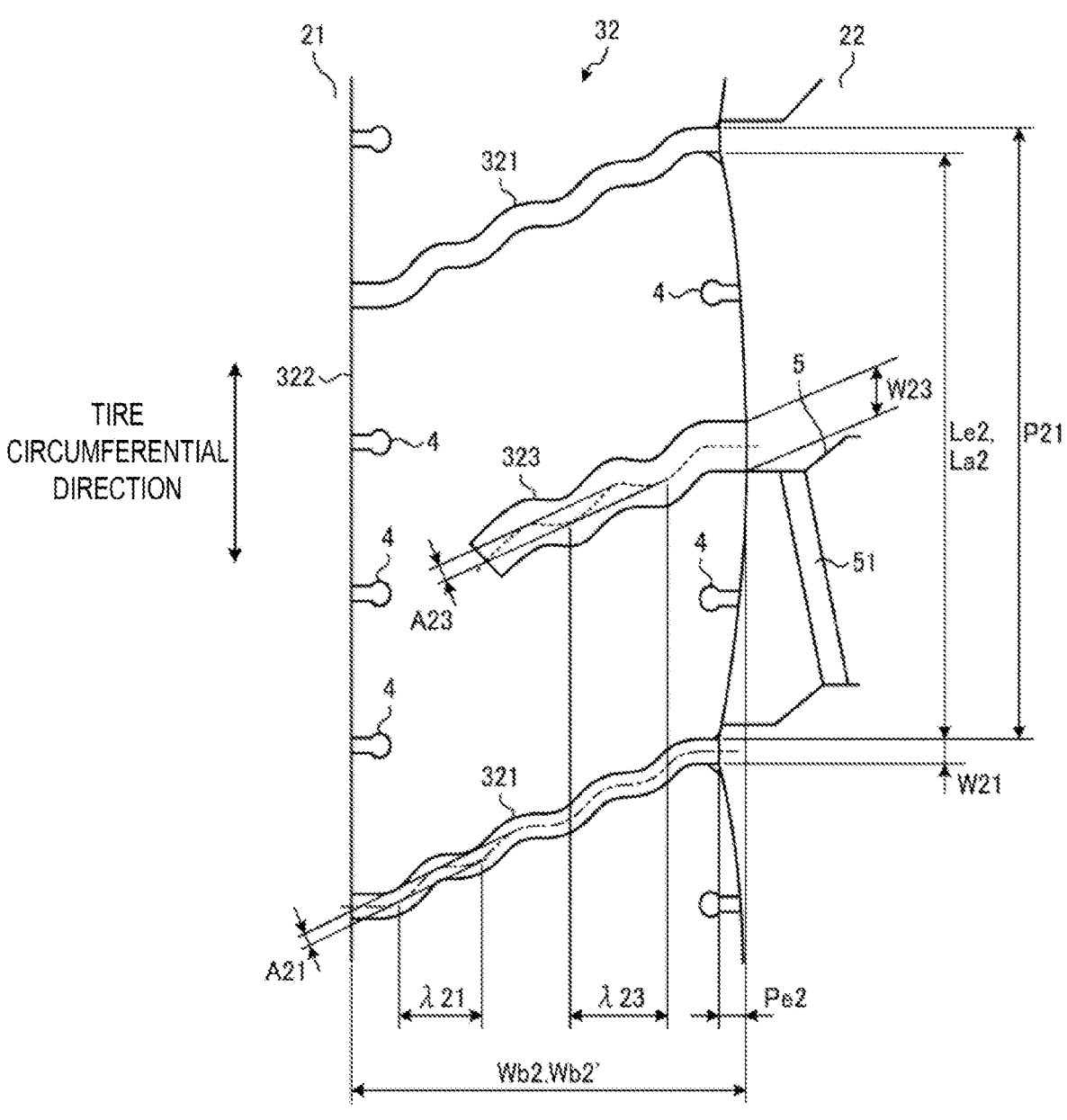
FIG. 4 is an enlarged plan view illustrating the middle land portion illustrated in FIG. 3.
Figure 5:
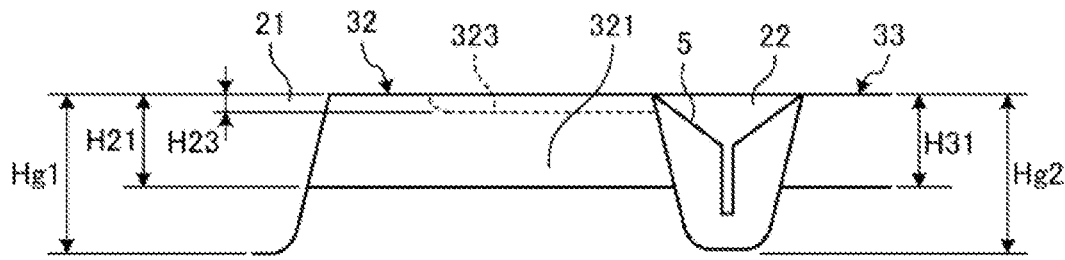
FIG. 5 is a cross-sectional view illustrating the middle land portion and the center land portion that are illustrated in FIG. 3.
Figure 6:
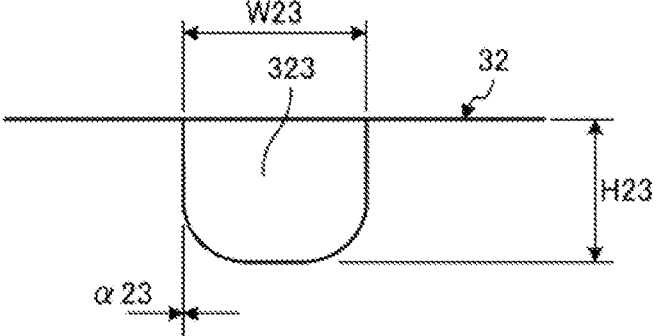
FIG. 6 is a cross-sectional view illustrating a non-through lug groove of the middle land portion illustrated in FIG. 3.

FIG. 3 is an enlarged plan view illustrating the middle land portion 32 and the center land portion 33 of the tire 1 illustrated in FIG. 2. FIG. 4 is an enlarged plan view illustrating the middle land portion 32 illustrated in FIG. 3. FIG. 5 is a cross-sectional view illustrating the middle land portion 32 and the center land portion 33 that are illustrated in FIG. 3. The same drawing illustrates a cross-sectional view when the land portions 32, 33 are cut along through narrow grooves 321, 331. FIG. 6 is a cross-sectional view illustrating a non-through lug groove 323 of the middle land portion 32 illustrated in FIG. 3. The same drawing illustrates a cross-sectional view perpendicular to the groove length direction of the non-through lug groove 323.

As illustrated in FIGS. 2 and 3, the middle land portion 32 includes a plurality of through narrow grooves 321, a plurality of middle blocks 322, and a plurality of non-through lug grooves 323.

As illustrated in FIG. 3, the through narrow groove 321 extends through the middle land portion 32 in the tire width direction and connects to the left and right circumferential grooves 21, 22. Additionally, the plurality of through narrow grooves 321 are arranged at predetermined intervals in the tire circumferential direction. Further, an inclination angle θ21 (see FIG. 3) of the through narrow groove 321 with respect to the tire circumferential direction is in the range $45° \leq θ21 \leq 90°$. Furthermore, a groove width W21 (see FIG. 4) of the through narrow groove 321 is in the range 0.4 mm≤W21≤1.5 mm. In addition, a groove depth H21 (see FIG. 5) of the through narrow groove 321 is in the range $0.30 \leq H21/Hg2 \leq 1.00$ with respect to the groove depth Hg2 of the center groove 22, and is preferably in the range $0.40 \leq H21/Hg2 \leq 0.70$. Moreover, the through narrow groove 321 is a sipe. By having the groove width W21 of 1.5 mm or less and the groove depth H21 exceeding 2.0 mm, the through narrow groove 321 is preferably closed when the tire comes into contact with the ground.

The inclination angle of the groove is measured as an inclination angle with respect to the tire circumferential direction of an imaginary straight line passing through both end portions of the groove when the tire is mounted on a specified rim, inflated to a specified internal pressure, and in an unloaded state.

Also, in FIG. 4, the through narrow groove 321 has a wave-like shape including three or more waves. In the configuration of FIG. 4, the through narrow groove 321 has a wave-like shape formed of eight curved points and thus has four waves. In such a configuration, compared with a configuration having straight or arc-shaped through narrow grooves (not illustrated), wet traction characteristics of the middle land portion 32 can be enhanced while the rigidity of the middle block 322 is maintained. Further, a wavelength λ21 of the wave-like shape of the through narrow groove 321 is in the range $0.10 \leq λ21/Wb2 \leq 0.50$ with respect to the ground contact width Wb2 of the middle land portion 32. Furthermore, an amplitude A21 of the wave-like shape of the through narrow groove 321 is in the range 0.6 mm≤A21≤2.5 mm.

The wave-like shape and the number of waves of the groove, and the wavelength and the amplitude of the groove are identified by a wave-like shape of a groove center line in a tread plan view. The groove center line is defined as an imaginary line connecting midpoints of the groove width.

As illustrated in FIGS. 2, 3 and 4, the middle block 322 is defined and formed by the adjacent through narrow grooves 321, 321. Further, the plurality of middle blocks 322 are arranged in a row in the tire circumferential direction. Furthermore, a circumferential length Le2 of the edge portion on the center groove 22 side of the middle block 322 is in the range $0.80 \leq Le2/Wb2' \leq 1.80$ with respect to a ground contact width Wb2' of the middle block 322, and is preferably in the range $1.10 \leq Le2/Wb2' \leq 1.50$. As a result, an aspect ratio of the middle block 322 is preferably set such that the middle block 322 is elongated in the tire circumferential direction. In such a configuration, compared with a configuration where the middle block is elongated in the tire width direction (not illustrated), the block rigidity in the tire circumferential direction is ensured, and uneven wear of the middle block 322 is effectively suppressed.

The circumferential length Le2 of the edge portion is measured as a distance in the tire circumferential direction of the edge portion facing the center groove 22 when the tire is mounted on a specified rim, inflated to a specified internal pressure, and in an unloaded state. Additionally, in a configuration where the corner portion of the middle block 322 has a chamfered portion, the circumferential length Le2 is measured by using an intersection point of a ridge line of the edge portion of the middle land portion 32 and a ridge line of the groove opening portion of the through narrow groove 321 in the tread contact surface as an end point.

Also, as illustrated in FIG. 4, the edge portion on the center groove 22 side of the middle block 322 has an arc shape that projects toward the tire equatorial plane CL side. In other words, the edge portion on the center groove 22 side of the middle block 322 projects toward the tire equatorial plane CL side in a region between the adjacent through narrow grooves 321, 321. Additionally, the edge portion has an arc shape as a whole, having the center in the middle block 322. Additionally, the through narrow groove 321 connects to the center groove 22 at the maximum amplitude position toward a tire ground contact edge T (see FIG. 2) side of the wave-like shape of the center groove 22.

In the configuration described above, (1) the middle block 322 of the middle land portion 32 is defined and formed by the narrower through narrow grooves 321, and thus the rigidity in the tire circumferential direction of the middle block 322 can be increased compared with a configuration where the middle block is defined by wider through lug grooves (not illustrated). Accordingly, uneven wear of the middle block 322 can be suppressed while the drainage function by the through narrow groove 321 is ensured. Further, (2) the edge portion on the center groove 22 side of the middle block 322 has an arc shape that projects toward the tire equatorial plane CL side, and thus, compared with a configuration where the middle block includes an edge portion having a recessed shape (not illustrated), the rigidity in the tire width direction of the middle block 322 is increased and uneven wear of the middle block 322 is suppressed. Furthermore, (3) the middle block 322 includes the non-through lug groove 323 that opens only to the edge portion on the tire equatorial plane CL side, and thus drainage properties of the tread portion center region can be improved while the rigidity of the middle block 322 is ensured. Accordingly, uneven wear resistance performance and wet performance of the tire can be provided in a compatible manner.

Further, in FIG. 4, the maximum projected position toward the tire equatorial plane CL side of the edge portion of the middle block 322 (a measurement point of the ground contact width Wb2' of the middle block 322, reference sign omitted in drawings) is in the center portion of the edge portion. Specifically, the maximum projected position is at a distance of 35% or more and 65% or less from one end of the circumferential length Le2 of the edge portion.

Furthermore, in FIG. 4, a circumferential length La2 of the arc shape of the edge portion is in the range $0.50 \leq La2/Le2 \leq 1.00$ with respect to the circumferential length Le2 of the edge portion of the middle block 322, and is preferably in the range $0.90 \leq La2/Le2 \leq 1.00$.

The circumferential length La2 of the arc shape is measured as a distance between adjacent inflection points of the wave-like shape of the center groove 22, including the maximum projected position of the edge portion of the middle block 322.

For example, in the configuration of FIG. 2, the wave-like shape of the center groove 22 has a continuous arch shape that is formed in an elongated shape projected toward the tire equatorial plane CL side and that is formed by connecting a plurality of arcs. In addition, the through narrow groove 321 connects to the connection position of the adjacent arcs. In other words, the through narrow grooves 321 respectively connect to both ends of one arc. As a result, the entirety of the edge portion on the center groove 22 side of the middle block 322 is formed of the single arc, and the ratio La2/Le2 described above is 1.00.

Also, in FIG. 4, a projection amount Pe2 toward the tire equatorial plane CL side of the edge portion of the middle block 322 is in the range $0.02 \leq Pe2/Wb2' \leq 0.20$ with respect to the ground contact width Wb2' of the middle block 322, and is preferably in the range $0.05 \leq Pe2/Wb2' \leq 0.12$. Additionally, the projection amount Pe2 is preferably in the range $1.0$ mm $\leq Pe2$. With the lower limit described above, the projection amount of the edge portion of the middle block 322 is ensured and the rigidity of the middle block 322 is appropriately reinforced, and thus uneven wear of the middle block 322 is suppressed. With the upper limit described above, uneven wear of the middle block 322, which is caused by the excessively large projection amount of the edge portion is suppressed.

As illustrated in FIG. 3, the non-through lug groove 323 opens at one end to the edge portion on the tire equatorial plane CL side of the middle block 322 and terminates at another end in the central portion of the middle block 322. Additionally, the plurality of non-through lug grooves 323 are arranged at predetermined intervals in the tire circumferential direction. Moreover, an extension length L23 in the tire width direction of the non-through lug groove 323 is in the range $0.40 \leq L23/Wb2' \leq 0.90$ with respect to the ground contact width Wb2' of the middle block 322, and is preferably in the range $0.50 \leq L23/Wb2' \leq 0.80$. With the lower limit described above, the drainage function of the non-through lug groove 323 is ensured, and with the upper limit described above, the rigidity of the middle block 322 is ensured. For example, in the configuration of FIG. 3, the non-through lug groove 323 is connected to the center groove 22 at the maximum amplitude position toward the tire equatorial plane CL side of the wave-like shape of the center groove 22. Accordingly, the extension length L23 in the tire width direction of the non-through lug groove 323 is ensured.

Additionally, in FIG. 3, an inclination angle θ23 with respect to the tire circumferential direction of the non-through lug groove 323 is in the range $-20° \leq \theta21 - \theta23 \leq 20°$ with respect to an inclination angle θ21 of the through narrow groove 321, and is preferably in the range $-10° \leq \theta21 - \theta23 \leq 10°$. Accordingly, the non-through lug groove 323 extends substantially parallel with the through narrow groove 321. Moreover, in FIG. 4, a groove width W23 of the non-through lug groove 323 is in the range $1.50 \leq W23/W21 \leq 5.50$ with respect to the groove width W21 of the through narrow groove 321, and is preferably in the range $2.00 \leq W23/W21 \leq 4.00$. The groove width W23 of the non-through lug groove 323 is in the range 1.5 mm $\leq W23 \leq 5.0$ mm.

Further, in FIG. 5, a groove depth H23 of the non-through lug groove 323 is in the range $0.10 \leq H23/Hg2 \leq 0.30$ with respect to the groove depth Hg2 of the center groove 22. Also, the groove depth H23 of the non-through lug groove 323 is smaller than the groove depth H21 of the through narrow groove 321. Further, in FIG. 6, the groove width W23 and the groove depth H23 of the non-through lug groove 323 have the relationship $1.00 \leq W23/H23 \leq 1.50$, and preferably have the relationship $1.20 \leq W23/H23 \leq 1.50$. Accordingly, the non-through lug groove 323 has a shallow bottom and a wide structure. As a result, the rigidity of the middle block 322 can be increased while the drainage function of the non-through lug groove 323 is ensured. Furthermore, in FIG. 6, a groove wall angle α23 of the non-through lug groove 323 is preferably in the range $90° \leq \alpha23 \leq 110°$.

Further, in FIG. 4, the non-through lug groove 323 has a wave-like shape having two or more waves. Furthermore, in the configuration of FIG. 4, the non-through lug groove 323 has a wave-like shape formed of five curved points and thus has two or three waves. In such a configuration, compared with a configuration including a non-through lug groove formed in a straight shape or an arc shape (not illustrated), wet traction characteristics of the middle land portion 32 can be increased while the rigidity of the middle block 322 is maintained. A wavelength λ23 of the wave-like shape of the non-through lug groove 323 is in the range $0.70 \leq \lambda23/\lambda21 \leq 1.30$ with respect to the wavelength λ21 of the wave-like shape of the through narrow groove 321, and is preferably in the range $0.90 \leq \lambda23/\lambda21 \leq 1.20$. In addition, an amplitude A23 of the wave-like shape of the non-through lug groove 323 is in the range $0.80 \leq A23/A21 \leq 1.50$ with respect to the amplitude A21 of the wave-like shape of the through narrow groove 321, and is preferably in the range $1.20 \leq A23/A21 \leq 1.50$.

Center Land Portion

Figure 7:
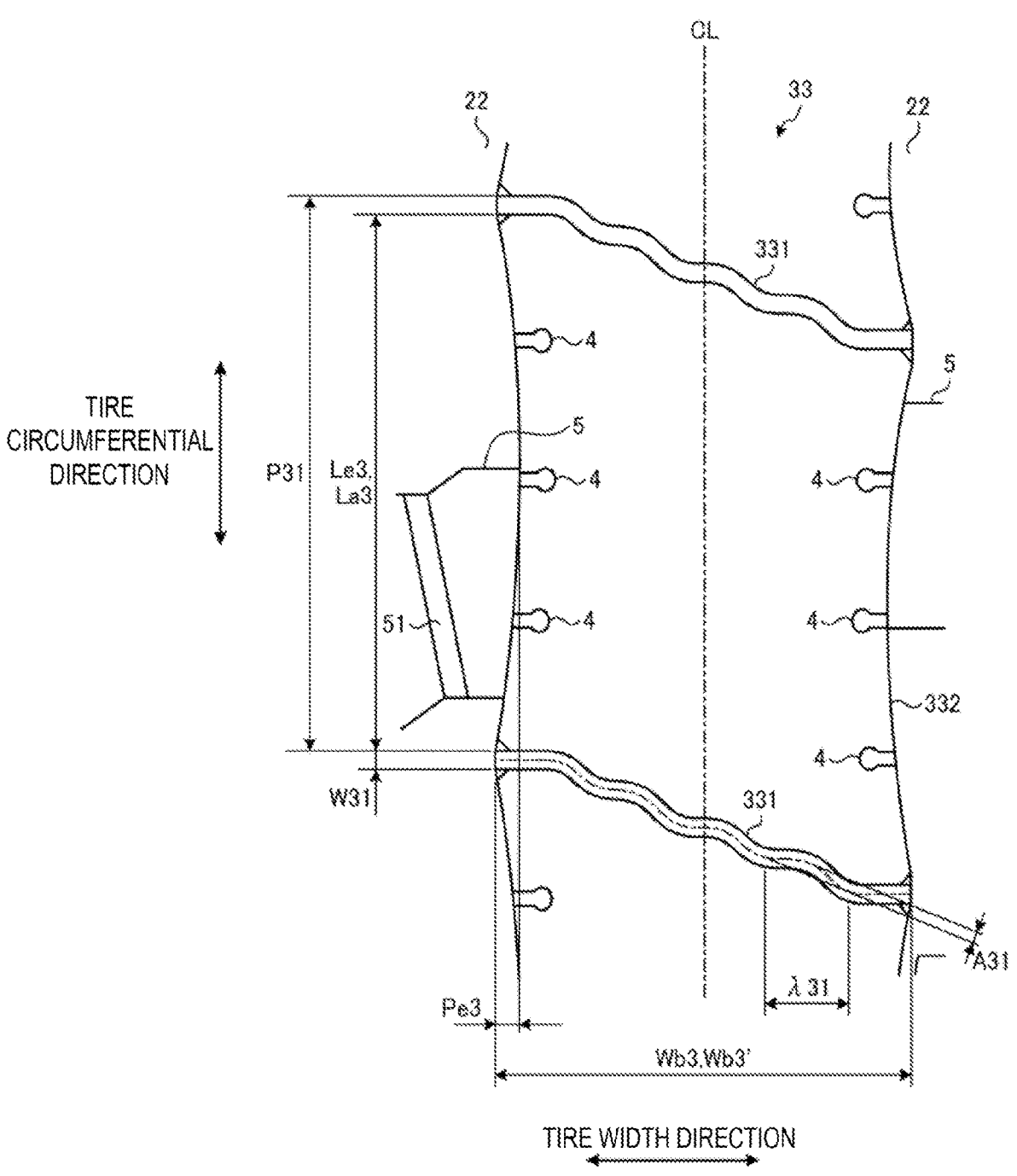
FIG. 7 is an enlarged plan view illustrating the center land portion illustrated in FIG. 3.

FIG. 7 is an enlarged plan view illustrating the center land portion 33 illustrated in FIG. 3.

As illustrated in FIGS. 2 and 3, the center land portion 33 includes a plurality of through narrow grooves 331 and a plurality of center blocks 332.

As illustrated in FIG. 3, the through narrow groove 331 extends through the center land portion 33 in the tire width direction and connects to the left and right circumferential grooves 22, 22. Further, the plurality of through narrow grooves 331 are arranged at predetermined intervals in the tire circumferential direction. Furthermore, an inclination angle θ31 (see FIG. 3) with respect to the tire circumferential direction of the through narrow groove 331 is in the range $45° \le θ31 \le 90°$. Additionally, a groove width W31 (see FIG. 7) of the through narrow groove 331 is in the range 0.4 mm$\le$W31$\le$1.5 mm. Additionally, a groove depth H31 (see FIG. 5) of the through narrow groove 331 is in the range $0.30 \le H31/Hg2 \le 1.00$ with respect to the groove depth Hg2 of the center groove 22, and is preferably in the range $0.40 \le H31/Hg2 \le 0.70$. Moreover, the through narrow groove 331 is a sipe. By having the groove width W31 of 1.5 mm or less and the groove depth H31 of 2.0 mm or more, the through narrow groove 331 is preferably closed when the tire comes into contact with the ground.

Further, in FIG. 7, the through narrow groove 331 has a wave-like shape similar to the wave-like shape of the through narrow groove 321 of the middle land portion 32 illustrated in FIG. 4. Specifically, the through narrow groove 331 of the center land portion 33 has a wave-like shape having three or more waves, and a wavelength λ31 thereof is in the range $0.10 \le λ31/Wb3 \le 0.50$ with respect to the ground contact width Wb3 of the center land portion 33. In addition, an amplitude A31 of the wave-like shape of the through narrow groove 331 is in the range 0.7 mm$\le$A31$\le$2.5 mm.

Furthermore, in the configuration of FIG. 2, the through narrow groove 331 of the center land portion 33 is inclined in the opposite direction in the tire circumferential direction with respect to the through narrow groove 321 of the middle land portion 32. As a result, the rigidity of the tread portion center region is increased. Additionally, the through narrow groove 331 of the center land portion 33 and the through narrow grooves 321, 321 of the left and right middle land portions 32, 32 are inclined mutually in the opposite direction with respect to the tire circumferential direction. Further, in FIG. 3, a distance Dg in the tire circumferential direction between the connection portion of the through narrow groove 331 of the center land portion 33 to the center groove 22 and the connection portion of the through narrow groove 321 of the middle land portion 32 to the center groove 22 is in the range $0 \le Dg/P21 \le 0.40$ with respect to a pitch length P21 between the through narrow grooves 321 of the middle land portion 32. In addition, the distance Dg is preferably in the range 0 mm$\le$Dg$\le$10 mm. Accordingly, a communication groove formed of the through narrow groove 331 of the center land portion 33 and the through narrow grooves 321, 321 of the left and right middle land portions 32, 32 has a zigzag shape with a large wavelength that has the maximum amplitude position on the center groove 22, and extends across the tread portion center region and connects to the left and right shoulder main grooves 21, 21. As a result, drainage properties of the tread portion center region are improved.

As illustrated in FIGS. 2 and 3, the center block 332 is defined and formed by the adjacent through narrow grooves 331, 331. Additionally, the plurality of center blocks 332 are arranged in a row in the tire circumferential direction. Further, in FIG. 7, a circumferential length Le3 of the edge portion of the center block 332 is in the range $0.80 \le Le3/Wb3' \le 1.80$ with respect to a ground contact width Wb3' of the center block 332, and is preferably in the range $1.10 \le Le3/Wb3' \le 1.50$. As a result, an aspect ratio of the center block 332 is preferably set such that the center block 332 is elongated in the tire circumferential direction. With such a configuration, compared with a configuration where the center block is elongated in the tire width direction (not illustrated), the block rigidity in the tire circumferential direction is ensured and uneven wear of the block is suppressed.

Furthermore, as illustrated in FIG. 7, the edge portion of the center block 332 has an arc shape that is recessed toward the tire equatorial plane CL side. Specifically, the center block 332 is located on the tire equatorial plane CL, and the left and right edge portions of the center block 332 have an arc shape that is recessed in the width direction of the center block 332 in a region between the adjacent through narrow grooves 331, 331. Additionally, the through narrow groove 331 connects to the center groove 22 at the maximum amplitude position toward the tire ground contact edge T (see FIG. 2) side of the wave-like shape of the center groove 22.

Additionally, in FIG. 7, the maximum recessed position of the edge portion of the center block 332 (a measurement point of the ground contact width Wb3' of the center block 332, reference sign omitted in the drawings) is in the central portion of the edge portion. Specifically, the maximum recessed position is at a distance of 35% or more and 65% or less from one end of the circumferential length Le3 of the edge portion.

Moreover, in FIG. 7, a circumferential length La3 of the arc shape of the edge portion is in the range $0.50 \le La3/Le3 \le 1.00$ with respect to the circumferential length Le3 of the edge portion of the center block 332, and is preferably in the range of $0.90 \le La3/Le3 \le 1.00$.

For example, in the configuration of FIG. 2, the wave-like shape of the center groove 22 has a continuous arch shape that is formed in an elongated shape projected toward the tire equatorial plane CL side and that is formed by connecting a plurality of arcs. In addition, the through narrow groove 331 connects to the connection position of the adjacent arcs. In other words, the through narrow grooves 331 respectively connect to both ends of one arc. As a result, the entirety of the edge portion on the center groove 22 side of the center block 332 is formed of the single arc, and the ratio La3/Le3 described above is 1.00.

Further, in FIG. 7, a recessed amount Pe3 of the edge portion of the center block 332 is in the range of $0.02 \le Pe3/Wb3' \le 0.20$ with respect to the ground contact width Wb3' of the center block 332, and is preferably in the range $0.05 \le Pe3/Wb3' \le 0.12$. Additionally, the recessed amount Pe3 is preferably in the range 1.0 mm$\le$Pe3. As a result, the edge portion of the center block 332 has an arc shape matching the arc shape of the edge portion of the middle block 322 described above.

Additionally, in FIG. 3, the connection portion of the through narrow groove 331 of the center land portion 33 to the center groove 22 and the connection portion of the through narrow groove 321 of the middle land portion 32 to the center groove 22 are substantially in the same position in the tire circumferential direction as described above. Accordingly, the wave-like shape of the edge portion of the center land portion 33 is disposed in a substantially identical phase with respect to the wave-like shape of the edge portion of the middle land portion 32. As a result, the recessed edge portion of the center block 332 matches the projected edge portion of the middle block 322, and the groove width of the center groove 22 having a wave-like shape is uniformly set.

Shoulder Land Portion

As illustrated in FIG. 2, the shoulder land portion 31 is a rib having a road contact surface continuous in the tire circumferential direction. Additionally, the shoulder land portion 31 includes only the multi sipes 4 and does not include other grooves or sipes. As a result, uneven wear resistance of the shoulder land portion 31 where uneven wear easily occurs can be improved. However, no such limitation is intended, and the shoulder land portion 31 may include shallow sipes or shallow grooves having a depth of 15 mm or less (not illustrated).

Slit of Tie Bar

Figure 8:
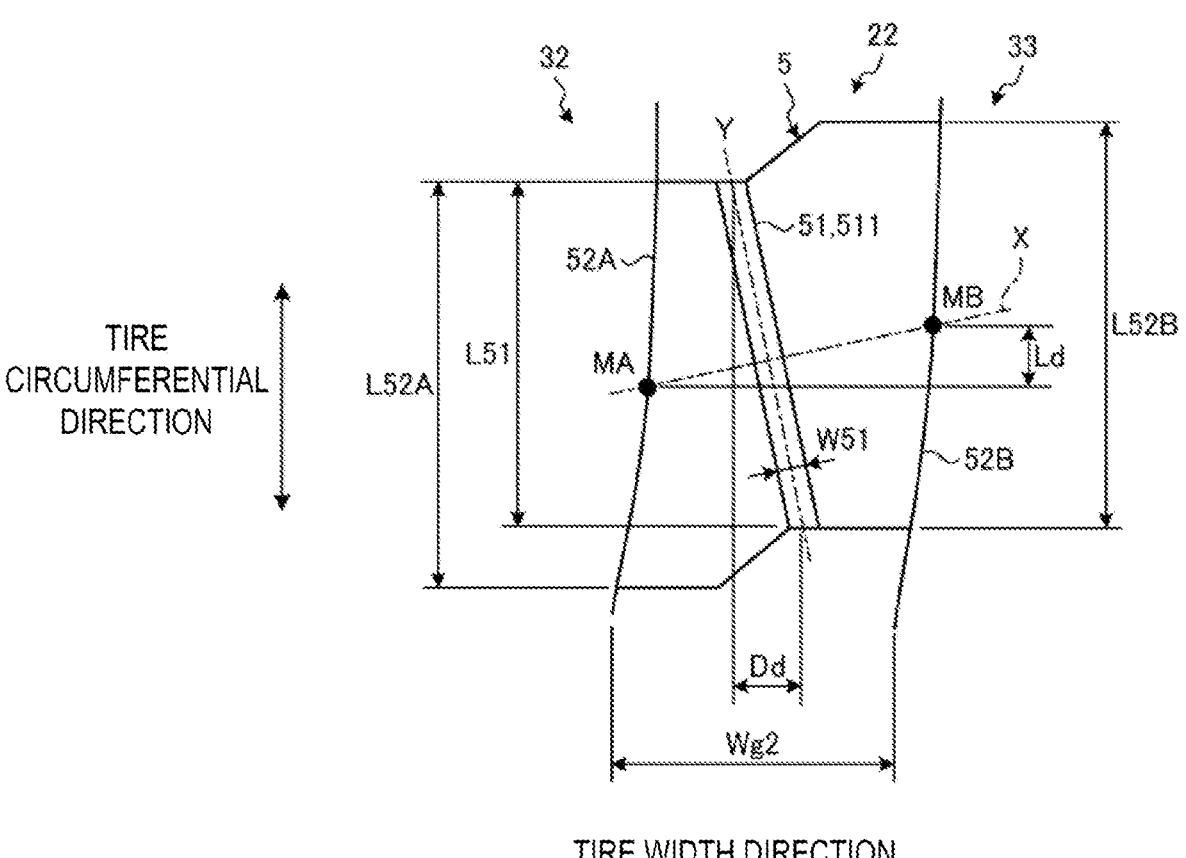
FIG. 8 is a plan view illustrating a tie bar of a center groove illustrated in FIG. 2.
Figure 9:
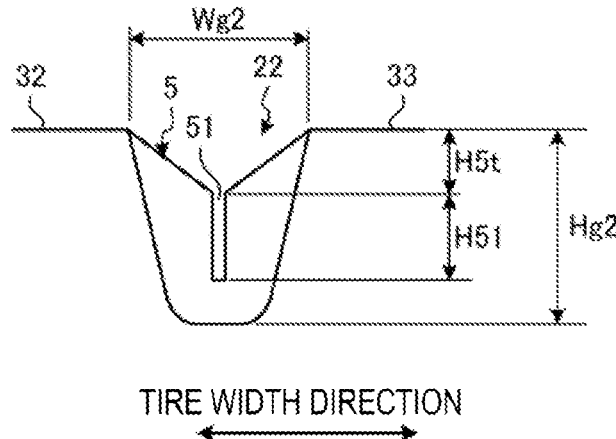
FIG. 9 is a width direction cross-sectional view of the tie bar illustrated in FIG. 8.
Figure 10:
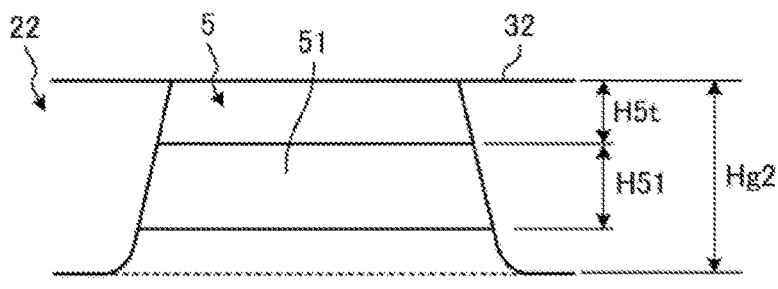
FIG. 10 is a circumferential direction cross-sectional view of the tie bar illustrated in FIG. 8.

FIG. 8 is a plan view illustrating a tie bar 5 of the center groove 22 illustrated in FIG. 2. FIGS. 9 and 10 are a width direction cross-sectional view (FIG. 9) and a circumferential direction cross-sectional view (FIG. 10) of the tie bar 5 illustrated in FIG. 8.

As illustrated in FIGS. 2 and 3, the center groove 22 includes a plurality of tie bars 5.

The tie bar 5 is a rib-shaped projection portion formed on the groove bottom of the center groove 22, and connects the land portions 32 and 33 adjacent to each other across the center groove 22. Further, the plurality of tie bars 5 are arranged at predetermined intervals in the tire circumferential direction. Furthermore, the pitch number of the tie bars 5 is equal to the pitch number of the middle blocks 322 each defined by the through narrow grooves 321. In such a configuration, the rigidity of the land portions 32, 33 when the tire comes into contact with the ground is reinforced by the tie bars 5. Note that in the configuration of FIG. 2, the center groove 22 includes the tie bars 5. However, no such limitation is intended, and the shoulder main groove 21 may include the tie bars 5 (not illustrated).

Additionally, in FIG. 3, as described above, each of the middle land portion 32 and the center land portion 33 includes the plurality of through narrow grooves 321; 331 extending through the land portion 32; 33, and the plurality of blocks 322; 332 each defined by the through narrow grooves 321; 331. Further, the tie bar 5 connects the middle block 322 of the middle land portion 32 and the center block 332 of the center land portion 33. Furthermore, the tie bar 5 is disposed between the adjacent through narrow grooves 321, 321; 331, 331 and connects to the blocks 322; 332. Accordingly, the tie bar 5 is disposed offset in the tire circumferential direction with respect to the respective opening portions of the through narrow grooves 321, 331 of each of the land portions 32, 33. As a result, the rigidity of the tie bar 5 is ensured, and the drainage function by the through narrow grooves 321, 331 is ensured.

Additionally, as illustrated in FIG. 8, the tie bar 5 includes one slit 51 and a pair of segments 52A, 52B.

The slit 51 extends through the tie bar 5 in the tire circumferential direction and opens to edge portions of the tie bar 5 within the center groove 22. The slit 51 has a width W51 (see FIG. 8) in the range 0.5 mm≤W51≤2.0 mm and a depth H51 (see FIG. 9) of 10 mm or more, and thus is closed when the tire comes into contact with the ground. As a result, reinforcement of the rigidity of the land portions 32, 33 by the tie bars 5 is ensured.

The width W51 of the slit 51 is measured as a maximum value of a distance between opposed groove walls of an opening portion of the slit 51 on the top surface of the tie bar 5 when the tire is mounted on a specified rim, inflated to a specified internal pressure, and in an unloaded state.

The depth H51 of the slit 51 is measured as a maximum value of a distance from the opening position of the slit 51 on the top surface of the tie bar 5 to the bottom of the slit 51 when the tire is mounted on a specified rim, inflated to a specified internal pressure, and in an unloaded state.

Further, the center line of the slit 51 has an inclined portion 511 that is inclined with respect to the tire circumferential direction in a tread plan view. Furthermore, the inclination angle of the inclined portion with respect to the tire circumferential direction (dimension symbol omitted in the drawings) is in the range of 2° or more and 20° or less. Additionally, in the configuration of FIG. 8, the slit 51 has a straight shape that is inclined with respect to the tire circumferential direction, and thus the entire slit 51 is the inclined portion 511. Further, both end portions of the slit 51 are disposed mutually offset in the tire width direction. Thus, the entire slit 51 is inclined with respect to the tire circumferential direction. Furthermore, the end portions of the slit 51 are disposed in the central portion of the circumferential groove 22. Specifically, a distance from each of the end portions of the slit 51 to the groove wall of the circumferential groove 22 (dimension symbol omitted in the drawings) is in the range of 20% or more and 80% or less with respect to the groove width Wg2 of the circumferential groove 22, and is preferably in the range of 30% or more and 65% or less.

In the configuration described above, (1) the circumferential groove 22 includes the tie bars 5 connecting the land portions 32, 33 adjacent to each other, and thus the rigidity of the land portions 32, 33 when the tire comes into contact with the ground is reinforced by the tie bars 5, and tire rolling resistance is reduced. Further, (2) the tie bar 5 includes the slit 51, and thus reduction in drainage properties of the circumferential groove 22, which is due to the installation of the tie bars 5 is suppressed. Furthermore, (3) the slit 51 is closed when the tire comes into contact with the ground, and thus reinforcement of the rigidity of the land portions 32, 33 by the tie bars 5 is ensured. Additionally, (4) the slit 51 includes the inclined portion 511 inclined with respect to the tire circumferential direction, and thus, when the slit 51 is closed, the wall surfaces of the slit 51 include engagement components in both the tire width direction and the tire circumferential direction. Accordingly, reinforcement of the rigidity of the land portions 32, 33 by the tie bars 5 is improved compared with a configuration where the slit does not include an engagement component in the tire circumferential direction (see FIG. 21 described below). As a result, low rolling resistance performance and wet performance of the tire are provided in a compatible manner.

Further, in FIG. 8, an extension distance Dd in the tire width direction of the center line of the slit 51 is in the range $0.60 \leq Dd/W51$ with respect to the width W51 of the slit 51, and is preferably in the range $1.50 \leq Dd/W51$. Accordingly, the above-described engagement component in the tire circumferential direction of the slit 51 when the slit 51 is closed is ensured. Also, the extension distance Dd of the slit 51 is in the range $Dd/Wg2 \leq 0.50$ with respect to the groove width Wg2 of the circumferential groove 22, and is preferably in the range $Dd/Wg2 \leq 0.20$.

The extension distance Dd in the tire width direction of the center line of the slit 51 is measured when the tire is mounted on a specified rim, inflated to a specified internal pressure, and in an unloaded state.

The pair of segments 52A, 52B are block-shaped portions divided by the slit 51. The segments 52A, 52B are respectively connected at one ends in the width direction of the tie bar 5 to the land portions 32, 33, and are opposed to each other at the other ends in the width direction of the tie bar 5 with the slit 51 interposed therebetween. Furthermore, in FIG. 8, a circumferential length L52A of the connection portion of the first segment 52A to the middle land portion 32 is in the range 0.30≤L52A/P21≤0.70 with respect to the pitch length P21 (see FIG. 3) between the through narrow grooves 321 of the middle land portion 32. Similarly, a circumferential length L52B of the connection portion of the second segment 52B to the center land portion 33 is in the range 0.30≤L52B/P31≤0.70 with respect to a pitch length P31 (see FIG. 7) between the through narrow grooves 331 of the center land portion 33. Also, a ratio between the circumferential lengths L52A, L52B of the pair of segments 52A, 52B is in the range 0.80≤L52B/L52A≤1.20.

Additionally, in FIG. 8, a circumferential length L51 of the slit 51 is in the range 0.20≤L51/L52A≤1.00 and in the range 0.20≤L51/L52B≤1.00 with respect to the circumferential lengths L52A, L52B of the connection portions of the first and second segments 52A, 52B to the land portions 32, 33, and is preferably in the range 0.70≤L51/L52A≤1.00 and in the range 0.70≤L51/L52B≤1.00. Accordingly, the engagement margin of the slit 51 is ensured.

Additionally, in the configuration of FIG. 8, the pair of segments 52A, 52B are disposed mutually offset in the tire circumferential direction. Accordingly, the engagement force in the tire circumferential direction of the slit 51 when the slit 51 is closed is increased. Specifically, in a tread plan view, a midpoint MA of the connection portion of the first segment 52A to the middle land portion 32 and a midpoint MB of the connection portion of the second segment 52B to the center land portion 33 are defined. The midpoints MA, MB are defined as midpoints of the circumferential lengths L52A, L52B of the connection portions of the first and second segments 52A, 52B, respectively. Additionally, as illustrated in FIG. 8, the midpoints MA, MB of the connection portions of the first and second segments 52A, 52B are disposed mutually offset in the tire circumferential direction. Also, an offset amount Ld is in the range 0.05≤Ld/L52A≤0.40 with respect to the circumferential length L52A of the connection portion of the first segment 52A, and is preferably in the range 0.10≤Ld/L52A≤0.20.

Additionally, in FIG. 8, an imaginary straight line X passing through the midpoints MA, MB of the connection portions of the first and second segments 52A, 52B to the land portions 32, 33 is defined. In the configuration of FIG. 8, as described above, the pair of segments 52A, 52B are disposed mutually offset in the tire circumferential direction, and thus the imaginary straight line X is inclined with respect to the tire width direction. At this time, the inclination direction of the entire slit 51, that is, an imaginary straight line passing through both end portions of the slit 51 (in FIG. 8, corresponding to the center line of the slit 51) is inclined with respect to the imaginary straight line X of the connecting portions of the segments 52A, 52B in mutually opposite directions in the tire circumferential direction. Accordingly, the engagement force in the tire circumferential direction of the slit 51 when the slit 51 is closed is increased.

Additionally, as illustrated in FIG. 9, in a cross-sectional view in the groove depth direction of the circumferential groove 22, the top surface of the tie bar 5 is further on the inner side in the tire radial direction than the tread contact surface. Accordingly, drainage properties of the circumferential groove 22 are ensured. In the configuration of FIG. 9, the distance from the road contact surface of the land portions 32, 33 to the top surface of the tie bar 5 (dimension symbol omitted in the drawings) monotonically increases from the connection portions of the tie bar 5 to the land portions 32, 33 toward the opening portion of the slit 51. Specifically, the top surface of the tie bar 5 is inclined in the groove depth direction of the circumferential groove 22 from the road contact surface of the land portions 32, 33 toward the opening portion of the slit 51, and thus has a V-shaped cross-sectional shape with the opening portion of the slit 51 as an apex. Accordingly, drainage properties of the circumferential groove 22 are increased.

Moreover, a maximum distance H5t from the road contact surface of the land portions 32, 33 to the top surface of the tie bar 5 is in the range 0<H5t/Hg2≤0.50 with respect to the groove depth Hg2 of the circumferential groove 22, and is preferably in the range 0.10≤H5t/Hg2≤0.40. With the lower limit described above, drainage properties of the circumferential groove 22 are ensured, and with the upper limit described above, reinforcement of the rigidity of the land portions 32, 33 by the tie bars 5 is ensured.

Additionally, in FIG. 9, a distance (H51+H5t) from the road contact surface of the land portions 32, 33 to the maximum depth position of the slit 51 is in the range 0.60≤(H51+H5t)/Hg2≤1.00, and is preferably in the range 0.80≤(H51+H5t)/Hg2≤0.98. With the lower limit described above, the effect of improvement in drainage properties by the slits 51 is ensured, and with the upper limit described above, reinforcement of the rigidity of the land portions 32, 33 by the tie bars 5 is ensured. Further, as illustrated in FIG. 10, the top surface of the tie bar 5 has the uniform maximum distance H5t, and the slit 51 has the uniform depth H51.

Furthermore, in the configuration of FIG. 9, the slit 51 has a predetermined width W51 (see FIG. 8) on the top surface of the tie bar 5, and has a substantially constant width in the depth direction. Specifically, the maximum width of the slit 51 in the entire region in the depth direction is 120% or less with respect to the width W51 of the tie bar 5 on the top surface, and is preferably 100% or less. Accordingly, reinforcement of the rigidity of the land portions 32, 33 when the slit 51 is closed is increased.

Shoulder Main Groove

Figure 16:
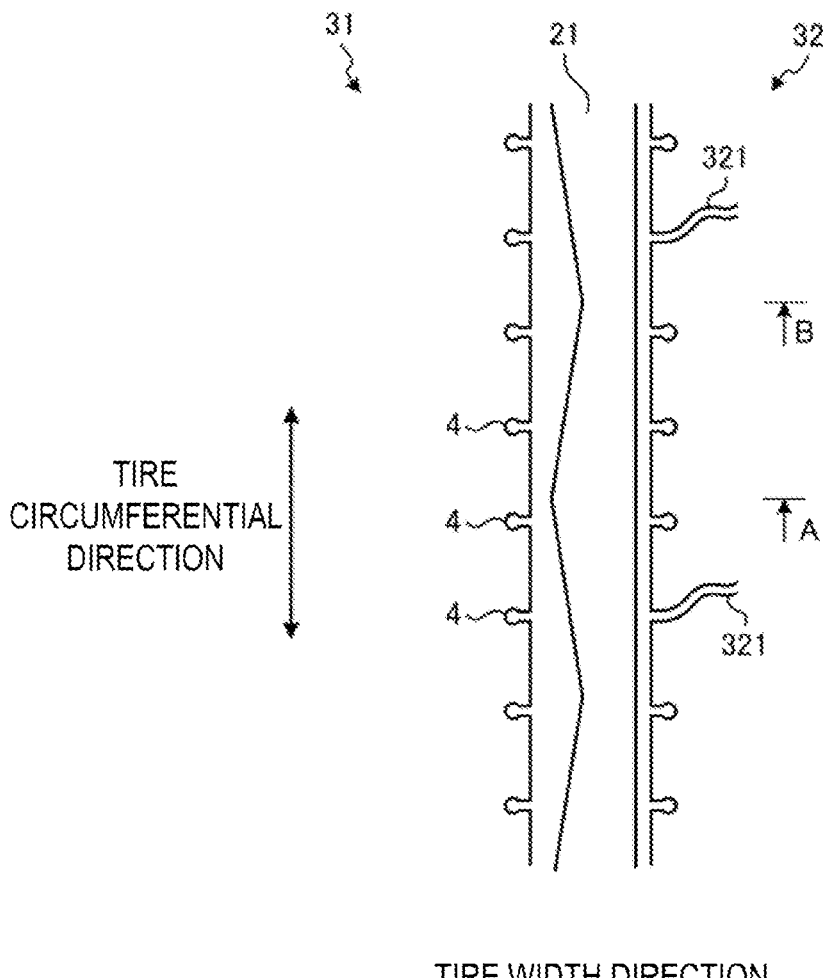
FIG. 16 is an enlarged plan view illustrating a shoulder main groove illustrated in FIG. 2.
Figure 17:
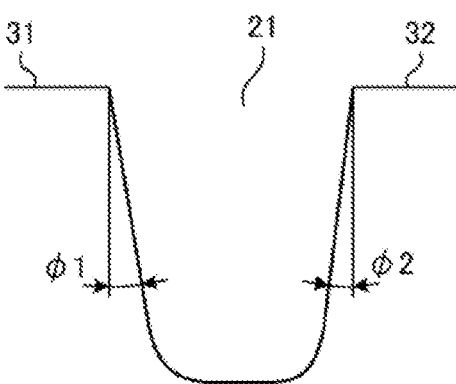
FIG. 17 is a cross-sectional view taken along line A, illustrating the shoulder main groove illustrated in FIG. 16.
Figure 18:
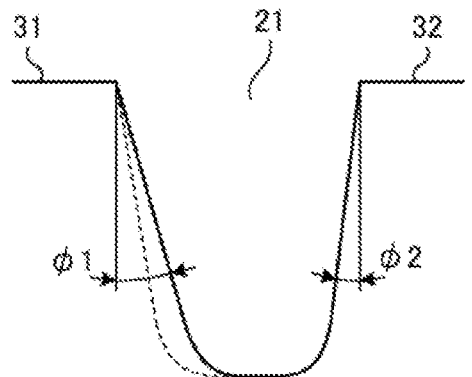
FIG. 18 is a cross-sectional view taken along line B, illustrating the shoulder main groove illustrated in FIG. 16.

FIG. 16 is an enlarged plan view illustrating the shoulder main groove illustrated in FIG. 2. FIGS. 17 and 18 are a cross-sectional view taken along line A (FIG. 17) and a cross-sectional view taken along line B (FIG. 18), illustrating the shoulder main groove illustrated in FIG. 16.

As illustrated in FIGS. 16 to 18, the ridge line of the connection portion between a groove bottom portion of the shoulder main groove 21 and a groove wall portion on the shoulder land portion 31 side of the shoulder main groove 21 in a tread plan view has a wave-like shape or a zigzag shape having an amplitude in the tire width direction. On the other hand, the ridge line of the connection portion between the groove bottom portion of the shoulder main groove 21 and a groove wall portion on the middle land portion 32 side of the shoulder main groove 21 has a straight shape. Such a configuration is preferable in that the rigidity of the shoulder land portion 31 is ensured and uneven wear of the shoulder land portion 31 is reduced, and at the same time, drainage properties of the shoulder main groove 21 are ensured. Further, a groove wall angle φ1 (defined as an inclination angle of the groove wall surface with respect to the normal line of the tread road contact surface) on the shoulder land portion 31 side of the shoulder main groove 21 is in the range 0°≤φ1−φ2 with respect to a groove wall angle φ2 on the middle land portion 32 side, and is preferably in the range 1°≤φ1−φ2. Furthermore, the groove wall angle φ1 on the shoulder land portion 31 side is in the range 3°≤φ1≤20°. Additionally, the radius of curvature (not illustrated) of the connection portion between the groove wall on the shoulder land portion 31 side of the shoulder main groove 21 and the groove bottom is equal to or greater than the radius of curvature of the connection portion between the groove wall on the middle land portion 32 side of the shoulder main groove 21 and the groove bottom. As a result, the rigidity of the shoulder land portion 31 is increased.

Modified Examples

Figure 11:
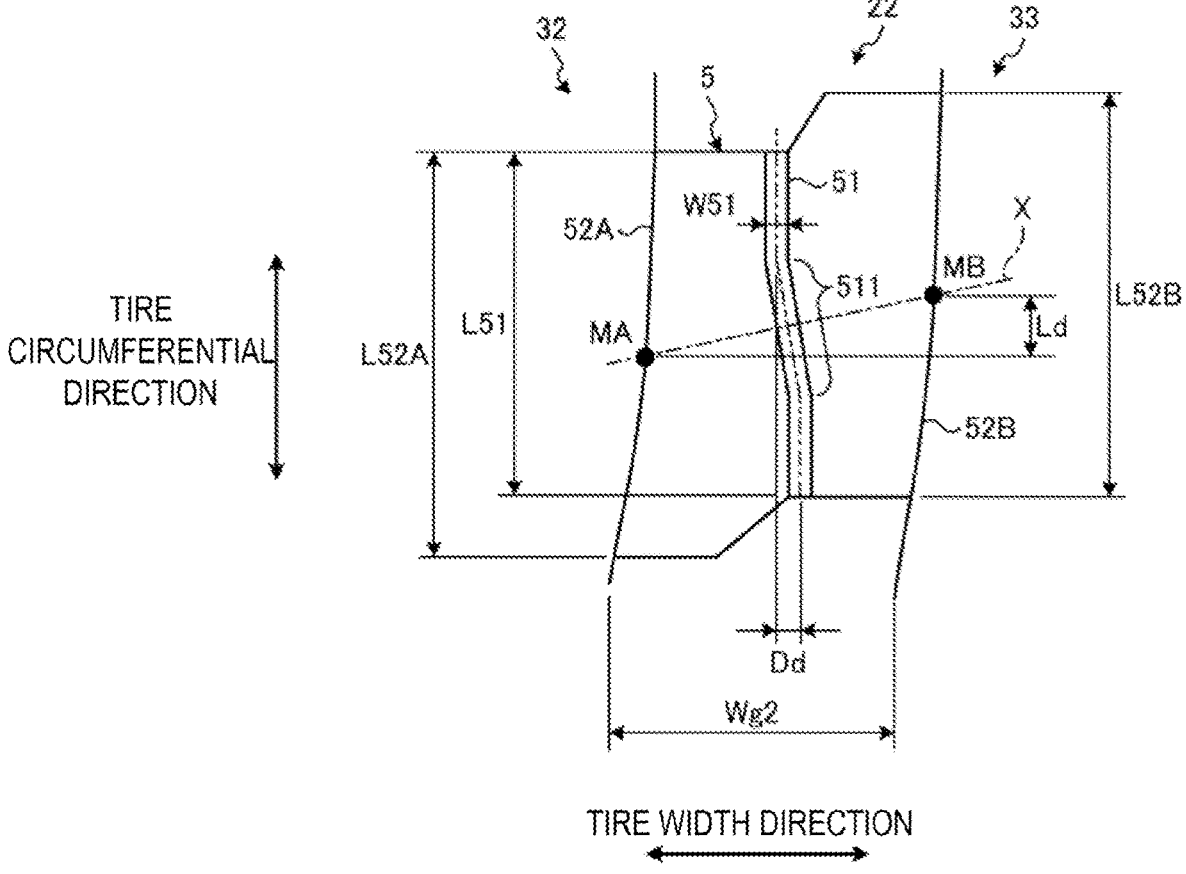
FIG. 11 is an explanatory diagram illustrating a modified example of the tie bar illustrated in FIG. 8.
Figure 12:
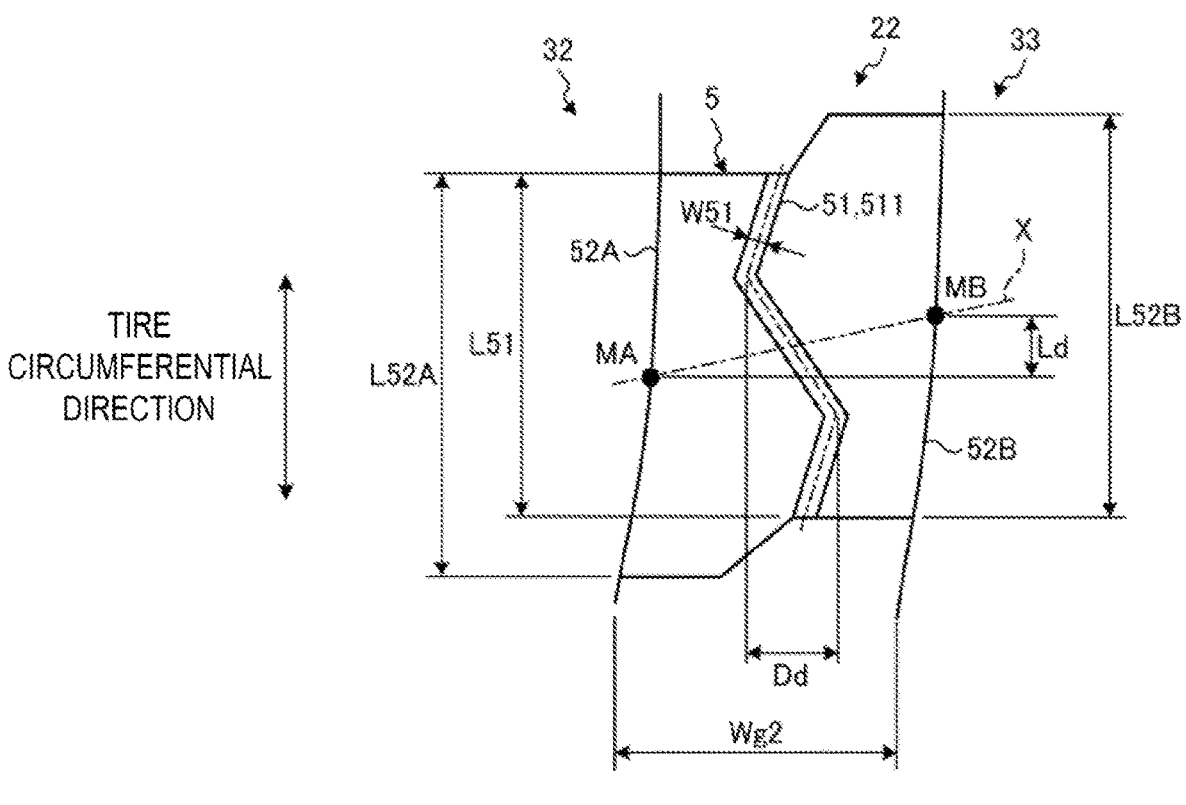
FIG. 12 is an explanatory diagram illustrating a modified example of the tie bar illustrated in FIG. 8.

FIGS. 11 and 12 are explanatory diagrams each illustrating a modified example of the tie bar 5 illustrated in FIG. 8. In the same drawings, the constituents that are the same as the constituents illustrated in FIG. 8 are denoted by the same reference signs, and explanations thereof are omitted.

In the configuration of FIG. 8, the slit 51 has a straight shape inclined with respect to the tire circumferential direction, and thus the entire slit 51 is the inclined portion 511. Further, both end portions of the slit 51 are disposed mutually offset in the tire width direction. Thus, the entire slit 51 is inclined with respect to the tire circumferential direction. Accordingly, the engagement component in the tire circumferential direction of the wall surfaces of the slit 51 when the slit 51 is closed is formed.

However, no such limitation is intended, and the slit 51 may include a bent portion or a curved portion in a tread plan view. For example, in the configuration of FIG. 11, the slit 51 has a gently bent shape and includes the inclined portion 511 in the central portion thereof, and both ends of the slit 51 extend parallel to the tire circumferential direction. Even in such a configuration, the engagement component in the tire circumferential direction of the wall surfaces of the slit 51 when the slit 51 is closed is ensured. Additionally, in the configuration of FIG. 12, the slit 51 has a zigzag shape with an amplitude in the tire width direction, and thus the entire slit 51 is the inclined portion 511. As a result, the engagement force of the wall surfaces of the slit 51 when the slit 51 is closed is enhanced. Also, no such limitation is intended, and the slit 51 may have a wave-like shape or a stepped shape with an amplitude in the tire width direction (not illustrated).

Figure 13:
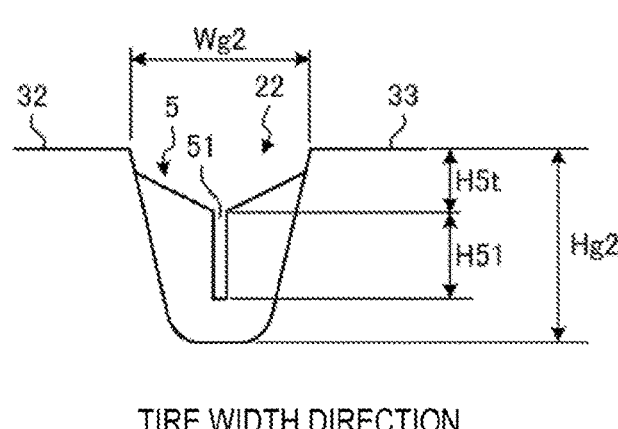
FIG. 13 is an explanatory diagram illustrating a modified example of the tie bar illustrated in FIG. 9.
Figure 14:
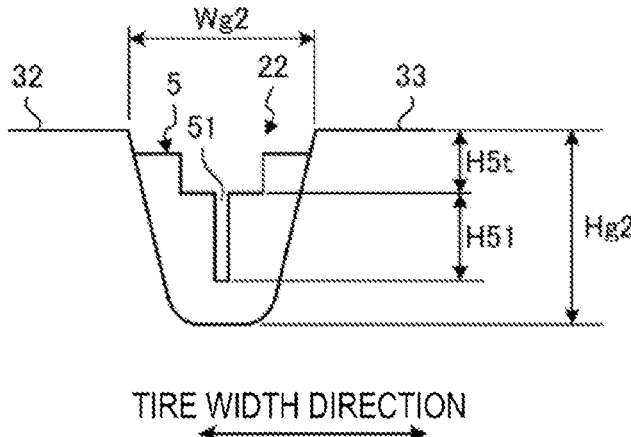
FIG. 14 is an explanatory diagram illustrating a modified example of the tie bar illustrated in FIG. 9.
Figure 15:
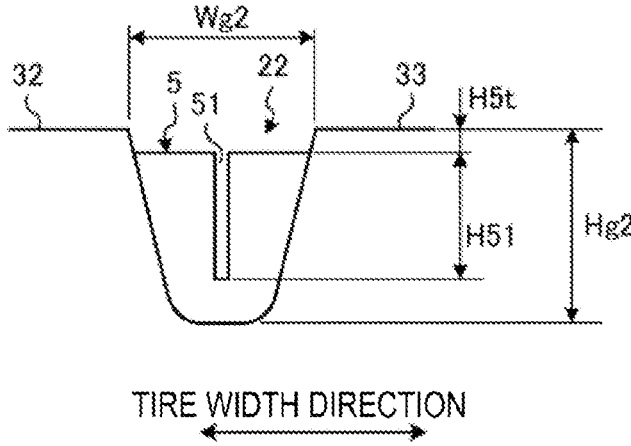
FIG. 15 is an explanatory diagram illustrating a modified example of the tie bar illustrated in FIG. 9.

FIGS. 13 to 15 are explanatory diagrams each illustrating a modified example of the tie bar 5 illustrated in FIG. 9. In the same drawings, the constituents that are the same as the constituents illustrated in FIG. 9 are denoted by the same reference signs, and explanations thereof are omitted.

In the configuration of FIG. 9, the top surface of the tie bar 5 is inclined in the groove depth direction of the circumferential groove 22 from the road contact surface of the land portions 32, 33 toward the opening portion of the slit 51, and thus has a V-shaped cross-sectional shape with the opening portion of the slit 51 as an apex. Such a configuration is preferable in that reinforcement of the land portions 32, 33 by the tie bars 5 can be increased while drainage properties of the circumferential groove 22 are maintained.

However, no such limitation is intended, and as illustrated in FIG. 13, the top surface of the tie bar 5 is connected to the groove walls of the circumferential groove 22 and thus may be offset with respect to the road contact surface of the land portions 32, 33. Accordingly, drainage properties of the circumferential groove 22 are improved. Further, as illustrated in FIG. 14, the top surface of the tie bar 5 may change in a stepped manner toward the opening portion of the slit

51. Furthermore, as illustrated in FIG. 15, the top surface of the tie bar 5 may have a flat shape.

Effect

As described above, the tire 1 includes the plurality of circumferential grooves 21, 22 extending in the tire circumferential direction and the plurality of land portions 31 to 33 defined by the circumferential grooves 21, 22 (see FIG. 2). Additionally, at least one circumferential groove (the center groove 22 in FIG. 2) includes the tie bars 5 formed in the groove bottom of the circumferential groove 22 and connecting the land portions 32, 33 adjacent to each other across the center groove 22 (see FIG. 3). Further, the tie bar 5 includes the slit 51 extending through the tie bar 5 in the tire circumferential direction and is closed when the tire comes into contact with the ground (see FIG. 8). Furthermore, the slit 51 includes the inclined portion 511 inclined with respect to the tire circumferential direction in a tread plan view.

In such a configuration, (1) the circumferential groove 22 includes the tie bars 5 that connect the land portions 32, 33 adjacent to each other, and thus the rigidity of the land portions 32, 33 when the tire comes into contact with the ground is reinforced by the tie bars 5, and tire rolling resistance is reduced. Further, (2) the tie bar 5 includes the slit 51, and thus reduction in drainage properties of the circumferential groove 22, which is due to the installation of the tie bars 5 is suppressed. Furthermore, (3) the slit 51 is closed when the tire comes into contact with the ground, and thus reinforcement of the rigidity of the land portions 32, 33 by the tie bars 5 is ensured. Additionally, (4) the slit 51 includes the inclined portion 511 inclined with respect to the tire circumferential direction, and thus, when the slit 51 is closed, the wall surfaces of the slit 51 include engagement components in both the tire width direction and the tire circumferential direction. Accordingly, reinforcement of the rigidity of the land portions 32, 33 by the tie bars 5 is improved compared with a configuration where the slit does not include an engagement component in the tire circumferential direction (see FIG. 21 described below). As a result, there is an advantage of providing low rolling resistance performance and wet performance of the tire in a compatible manner.

Further, in the tire 1, both end portions of the slit 51 are disposed mutually offset in the tire width direction (see FIG. 8). Accordingly, there is an advantage that the engagement force of the slit 51 in the tire circumferential direction when the slit 51 is closed is increased.

Furthermore, in the tire 1, the extension distance Dd in the tire width direction of the center line of the slit 51 is in the range 1.50≤Dd/W51 with respect to the width W51 of the slit 51 (see FIG. 8). Accordingly, there is an advantage that the engagement component in the tire circumferential direction of the slit 51 when the slit 51 is closed is ensured.

Moreover, in the tire 1, the width W51 (see FIG. 8) of the slit 51 is in the range 0.5 mm≤W51≤2.0 mm. With the lower limit described above, there is an advantage that the drainage function of the slit 51 is ensured, and with the upper limit described above, there is an advantage that the slit 51 is appropriately closed when the tire comes into contact with the ground.

Additionally, in the tire 1, the slit 51 includes a bent portion or a curved portion in a tread plan view (see FIGS. 11 and 12). In such a configuration, compared with a configuration where the slit 51 has a straight shape (see FIG. 8), there is an advantage that the engagement force of the wall surfaces of the slit 51 when the slit 51 is closed is increased, and reinforcement of the rigidity by the slits 51 is increased.

Further, in the tire 1, the land portion 32; 33 includes the plurality of through narrow grooves 321; 331 extending through the land portion 32; 33, and the plurality of blocks 322; 332 each defined by the through narrow grooves 321; 331 (see FIG. 2). Also, the tie bar 5 is disposed between the adjacent through narrow grooves 321, 321; 331, 331 and connects to the blocks 322; 332 (see FIG. 3). Accordingly, the tie bar 5 is disposed offset in the tire circumferential direction with respect to the respective opening portions of the through narrow grooves 321, 331 of each of the land portions 32, 33. As a result, there is an advantage that the rigidity of the tie bar 5 is ensured and the drainage function by the through narrow grooves 321, 331 is ensured.

Furthermore, in the tire 1, the tie bar 5 includes the first and second segments 52A, 52B defined by the slit 51 (see FIG. 8). Also, the circumferential length L51 of the slit 51 is in the range 0.20≤L51/L52A≤1.00 and in the range 0.20≤L51/L52B≤1.00 with respect to the circumferential lengths L52A, L52B of the connection portions of the first and second segments 52A, 52B to the land portions 32, 33. Accordingly, there is an advantage that the engagement margin of the slit 51 when the slit 51 is closed is ensured.

Additionally, the first and second segments 52A, 52B are disposed mutually offset in the tire circumferential direction. Accordingly, there is an advantage that the engagement force of the slit 51 in the tire circumferential direction when the slit 51 is closed is increased.

Moreover, the imaginary straight line X passing through the midpoints MA, MB of the connection portions of the first and second segments 52A, 52B to the land portions 32, 33 is defined. At this time, an imaginary straight line (not illustrated) passing through both end portions of the slit 51 and the imaginary straight line X of the first and second segments 52A, 52B are inclined in the mutually opposite directions with respect to the circumferential direction. Accordingly, there is an advantage that the engagement force of the slit 51 in the tire circumferential direction when the slit 51 is closed is increased.

Further, in the tire 1, the top surface of the tie bar 5 is further on the inner side in the tire radial direction than the tread contact surface (see FIG. 9). Accordingly, there is an advantage that drainage properties of the circumferential groove 22 are ensured.

Furthermore, in the tire 1, in a cross-sectional view in the groove depth direction of the circumferential groove 22, the distance H5t from the road contact surface of the land portions 32, 33 to the top surface of the tie bar 5 monotonically increases from the connection portions of the tie bar 5 to the land portions 32, 33 toward the opening portion of the slit 51. Accordingly, there is an advantage that drainage properties of the circumferential groove 22 are increased.

Additionally, in the tire 1, the maximum distance H5t from the road contact surface of the land portions 32, 33 to the top surface of the tie bar 5 is in the range 0<H5t/Hg2≤0.50 with respect to the groove depth Hg2 of the circumferential groove 22 (see FIG. 9). With the lower limit described above, there is an advantage that the drainage function of circumferential groove 22 is ensured, and with the upper limit described above, there is an advantage that reinforcement of the rigidity of the land portions 32, 33 by the tie bars 5 is ensured.

Target of Application

Additionally, the tire 1 is a heavy duty pneumatic radial tire mounted on a steered wheel of a tractor. Such a tire is a target of application, and thus low rolling resistance performance and wet performance of the tire can be effectively provided in a compatible manner.

Additionally, in the embodiments, a pneumatic tire is described as an example of the tire. However, no such limitation is intended, and the configurations described in the embodiments can also be applied to other tires in a discretionary manner within the scope apparent to one skilled in the art. Examples of other tires include an airless tire, and a solid tire.

Examples

Figure 19:
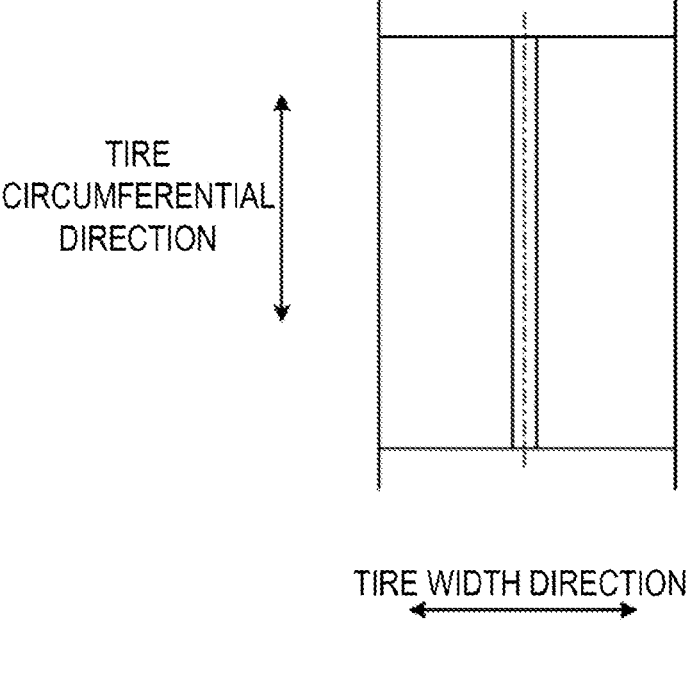
FIG. 19 is an explanatory diagram illustrating a test tire of Comparative Example.

FIG. 19 is an explanatory diagram illustrating a test tire of Comparative Example. FIGS. 20 and 21 are tables each indicating the results of performance tests of tires according to embodiments of the technology.

In the performance tests, (1) low rolling resistance performance and (2) wet traction performance were evaluated for a plurality of types of test tires. Test tires having a tire size of 11R22.5 were assembled on rims specified by JATMA, and an internal pressure specified by JATMA and a load specified by JATMA were applied to the test tires. Additionally, the test tires were each mounted on a 2-D tractor head that is a test vehicle. Also, when the evaluation is 99 or more, it can be said that the performance is properly ensured.

In the evaluation on low rolling resistance performance, a drum testing machine having a drum diameter of 1707 mm is used, and a multiplicative inverse of a rolling resistance coefficient of the test tire is calculated under a load of 28.76 kN, under air pressure of 900 kPa, and at speed of 60 km/h in accordance with ISO (International Organization for Standardization) 28580 and the evaluation is performed. The evaluation is expressed as index values and evaluated, with Comparative Example being assigned as the reference (100). In the evaluation, larger values are preferable.

In the evaluation on wet traction performance, the test vehicle is driven on an asphalt road covered with 1 mm of water, and the travel time from the travel speed of 5 km/h to the travel speed of 20 km/h is measured. Then, the results are expressed as index values and evaluated, with Comparative Example being assigned as the reference (100). In this evaluation, larger values are preferable.

Each of the test tires of Examples includes the configurations illustrated in FIGS. 1 and 2. The middle land portion 32 includes the through narrow grooves 321, the middle blocks 322, and the non-through lug grooves 323. Additionally, the circumferential grooves 21, 22 have a straight shape, and each of the left and right center grooves 22, 22 has the plurality of tie bars 5. Also, the tie bar 5 includes the slit 51 (see FIG. 8). Furthermore, the groove width Wg1 of the shoulder main groove 21 is 13.0 mm, and the groove depth Hg1 of the shoulder main groove 21 is 16.2 mm. Additionally, the groove width Wg2 of the center groove 22 is 12.0 mm, and the groove depth Hg2 of the center groove 22 is 16.2 mm. Additionally, the tire ground contact width TW is 220 mm, the ground contact width Wb1 of the shoulder land portion 31 is 41.5 mm, the ground contact width Wb2 of the middle land portion 32 is 30.0 mm, and the ground contact width Wb3 of the center land portion 33 is 31.0 mm. Additionally, the width W51 of the slit 51 is 0.8 mm, and the depth H51 of the slit 51 is 15.0 mm.

The test tire of Comparative Example is configured such that the tie bar 5 includes the configuration of FIG. 21 in the test tire of Example 1. Specifically, the slit 51 of the tie bar 5 has a straight shape parallel to the tire circumferential direction, and the segments 52A, 52B of the tie bar 5 are disposed and aligned in the tire circumferential direction.

As can be seen from the test results, the test tires of Examples provide low rolling resistance performance and wet traction performance in a compatible manner.

What is claimed is:

1. A tire, comprising:
a plurality of circumferential grooves extending in a tire circumferential direction; and
a plurality of land portions defined by the circumferential grooves;
at least one of the circumferential grooves comprising a tie bar formed in a groove bottom of the at least one of the circumferential grooves and connecting the land portions adjacent to each other across the at least one of the circumferential grooves,
the tie bar comprising a slit that extends through the tie bar in the tire circumferential direction and that is closed when the tire comes into contact with a ground, and
a center line of the slit comprising an inclined portion that is inclined with respect to the tire circumferential direction in a tread plan view, wherein
the tie bar comprises first and second segments defined by the slit,
an imaginary straight line X passing through midpoints of connection portions of the first and second segments to the land portions is defined, and
an imaginary straight line passing through both ends of the slit and the imaginary straight line X of the first and second segments are inclined in mutually opposite directions with respect to the tire circumferential direction, wherein
the slit comprises a bent portion or a curved portion in the tread plan view.

2. The tire according to claim 1, wherein an extension distance Dd of the center line of the slit in a tire width direction is in a range $1.50 \leq Dd/W51$ with respect to a width W51 of the slit.

3. The tire according to claim 1, wherein a width W51 of the slit is in a range 0.5 mm$\leq$W51$\leq$2.0 mm.

4. The tire according to claim 1, wherein
the land portions comprise a plurality of through narrow grooves extending through the land portions, and a plurality of blocks defined by the through narrow grooves, and
the tie bar is disposed between the through narrow grooves adjacent to each other in the tire circumferential direction and is connected to the blocks.

5. The tire according to claim 1, wherein
a circumferential length L51 of the slit is in a range $0.20 \leq L51/L52A \leq 1.00$ and a range $0.20 \leq L51/L52B \leq 1.00$ with respect to circumferential lengths L52A, L52B of connection portions of the first and second segments to the land portions.

6. The tire according to claim 1, wherein
the first and second segments are disposed mutually offset in the tire circumferential direction.

7. The tire according to claim 1, wherein a top surface of the tie bar is further on an inner side in a tire radial direction than a tread contact surface.

8. The tire according to claim 1, wherein, in a cross-sectional view in a groove depth direction of the circumferential grooves, a distance from a road contact surface of the land portions to a top surface of the tie bar monotonically increases from connection portions of the tie bar to the land portions toward an opening portion of the slit.

9. The tire according to claim 1, wherein the at least one of the circumferential grooves comprising the tie bar is a center groove, and a maximum distance H5t from a road contact surface of the land portions to a top surface of the tie bar is in a range $0 < H5t/Hg2 \leq 0.50$ with respect to a groove depth Hg2 of the center groove.

10. The tire according to claim 1, wherein an extension distance Dd of the center line of the slit in a tire width direction is in a range $1.50 \leq Dd/W51$ with respect to a width W51 of the slit, and is in a range $Dd/Wg2 \leq 0.20$ with respect to a groove width Wg2 of the circumferential groove.

11. The tire according to claim 1, wherein a circumferential length L51 of the slit is in a range $0.20 \leq L51/L52A \leq 0.95$ and a range $0.20 \leq L51/L52B \leq 0.95$ with respect to circumferential lengths L52A, L52B of connection portions of the first and second segments to the land portions.

12. The tire according to claim 1, wherein
the plurality of circumferential grooves are formed of a pair of shoulder main grooves and two center grooves, and
a groove width Wg2 of the center groove is in a range $0.20 \leq Wg2/Wg1 \leq 1.00$ with respect to a groove width Wg1 of the shoulder main grooves.

13. The tire according to claim 1, wherein the land portions comprise a plurality of through narrow grooves extending through the land portions and a plurality of blocks defined by the through narrow grooves, the through narrow grooves each having a wave-like shape including three or more waves.

14. The tire according to claim 13, wherein the tie bar is disposed between the through narrow grooves adjacent to each other and is connected to the blocks.

15. The tire according to claim 1, wherein both end portions of the slit are disposed mutually offset in a tire width direction.

16. The tire according to claim 15, wherein an extension distance Dd of the center line of the slit in a tire width direction is in a range $1.50 \leq Dd/W51$ with respect to a width W51 of the slit.

17. The tire according to claim 16, wherein the width W51 of the slit is in a range 0.5 mm$\leq$W51$\leq$2.0 mm.

18. The tire according to claim 17, wherein
the land portions comprise a plurality of through narrow grooves extending through the land portions, and a plurality of blocks defined by the through narrow grooves, and
the tie bar is disposed between the through narrow grooves adjacent to each other in the tire circumferential direction and is connected to the blocks.

19. The tire according to claim 18, wherein
a circumferential length L51 of the slit is in a range $0.20 \leq L51/L52A \leq 1.00$ and a range $0.20 \leq L51/L52B \leq 1.00$ with respect to circumferential lengths L52A, L52B of connection portions of the first and second segments to the land portions.

20. The tire according to claim 19, wherein
the tie bar comprises the first and the second segments defined by the slit, and
the first and the second segments are disposed mutually offset in the tire circumferential direction.

21. The tire according to claim 20, wherein a top surface of the tie bar is further on an inner side in a tire radial direction than a tread contact surface.

22. A tire, comprising:
a plurality of circumferential grooves extending in a tire circumferential direction; and a plurality of land portions defined by the circumferential grooves;

at least one of the circumferential grooves comprising a tie bar formed in a groove bottom of the at least one of the circumferential grooves and connecting the land portions adjacent to each other across the at least one of the circumferential grooves, the tie bar comprising a slit that extends through the tie bar in the tire circumferential direction and that is closed when the tire comes into contact with a ground, a center line of the slit comprising an inclined portion that is inclined with respect to the tire circumferential direction in a tread plan view, the land portions comprising a plurality of through narrow grooves extending through the land portions and a plurality of blocks defined by the through narrow grooves, the tie bar being disposed between the through narrow grooves adjacent to each other and the tie bar being connected to the blocks, and a tangent line of an edge portion of the blocks at a connection position of the tie bar being inclined in one direction with respect to the tire circumferential direction, the tangent line to the edge portion of the block and an imaginary straight line passing through both ends of the slit being inclined in opposite directions to each other with respect to the tire circumferential direction.

23. The tire according to claim 22, wherein an edge portion on the circumferential groove side of one of the blocks has an arc shape that projects toward a tire equatorial plane side, and an edge portion on the circumferential grooves side of the other of the blocks has an arc shape that is recessed toward the tire equatorial plane side.

24. The tire according to claim 22, wherein the tie bar comprises first and second segments defined by the slit, an imaginary straight line X passing through midpoints of connection portions of the first and second segments to the land portions is defined, and an imaginary straight line passing through both ends of the slit and the imaginary straight line X of the first and second segments are inclined in mutually opposite directions with respect to the tire circumferential direction.

25. A tire, comprising:

a plurality of circumferential grooves extending in a tire circumferential direction; and a plurality of land portions defined by the circumferential grooves;

at least one of the circumferential grooves comprising a tie bar formed in a groove bottom of the at least one of the circumferential grooves and connecting the land portions adjacent to each other across the at least one of the circumferential grooves, the tie bar comprising a slit that extends through the tie bar in the tire circumferential direction and that is closed when the tire comes into contact with a ground, a center line of the slit comprising an inclined portion that is inclined with respect to the tire circumferential direction in a tread plan view, the slit extending straight, without bending, from one edge portion of the tie bar to an other edge portion of the tie bar, and the tie bar comprises first and second segments defined by the slit, and a circumferential length L51 of the slit is in a range $0.20 \leq L51/L52A \leq 0.95$ and a range $0.20 \leq L51/L52B \leq 0.95$ with respect to circumferential lengths L52A, L52B of connection portions of the first and second segments to the land portions.

* * * * *